(12) United States Patent
Greaves et al.

(10) Patent No.: US 11,300,857 B2
(45) Date of Patent: Apr. 12, 2022

(54) WEARABLE MOUNTS FOR PORTABLE CAMERA

(71) Applicant: Opkix, Inc., Costa Mesa, CA (US)

(72) Inventors: Christopher Lawrence Greaves, Huntington Beach, CA (US); John McGuinness, Huntington Beach, CA (US); Shahin Amirpour, Huntington Beach, CA (US); Ryan Mikah Fuller, Costa Mesa, CA (US); Christopher Steven David Albanese, Huntington Beach, CA (US)

(73) Assignee: Opkix, Inc., Costa Mesa, CA (US)

( * ) Notice: Subject to any disclaimer, the term of this patent is extended or adjusted under 35 U.S.C. 154(b) by 0 days.

(21) Appl. No.: 16/681,021

(22) Filed: Nov. 12, 2019

(65) Prior Publication Data

US 2020/0285134 A1    Sep. 10, 2020

Related U.S. Application Data

(60) Provisional application No. 62/760,915, filed on Nov. 13, 2018.

(51) Int. Cl.
*G03B 17/56* (2021.01)
*F16M 13/04* (2006.01)
*H04N 5/225* (2006.01)

(52) U.S. Cl.
CPC ........... *G03B 17/563* (2013.01); *F16M 13/04* (2013.01); *H04N 5/2251* (2013.01)

(58) Field of Classification Search
USPC ....................................................... 396/420
See application file for complete search history.

(56) References Cited

U.S. PATENT DOCUMENTS

| 3,476,467 A | 11/1969 | Curry |
| 3,593,449 A | 7/1971 | Nielson |
| 3,780,918 A | 12/1973 | Curtis |
| 4,298,913 A | 11/1981 | Lozar et al. |
| 4,351,086 A | 9/1982 | Drlik |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |

(Continued)

FOREIGN PATENT DOCUMENTS

| CA | 154079 S | 12/2014 |
| CN | 1117593 A | 2/1996 |

(Continued)

OTHER PUBLICATIONS

6 LED 7 mm Lens IP67 1M USB Endoscope for Android Smartphone and PC, Tindeal DV+, Jan. 19, 2016, https://www.youtube.com/watch?v=XAWAgtMgU50.

(Continued)

*Primary Examiner* — Clayton E. LaBalle
*Assistant Examiner* — Warren K Fenwick
(74) *Attorney, Agent, or Firm* — Knobbe, Martens, Olson & Bear, LLP

(57) ABSTRACT

A variety of wearable mounts for a portable camera are disclosed. The variety of wearable mounts includes a ring mount, a necklace mount, a hat mount, and an eyewear mount.

4 Claims, 21 Drawing Sheets

(56) References Cited

U.S. PATENT DOCUMENTS

Figure 1:
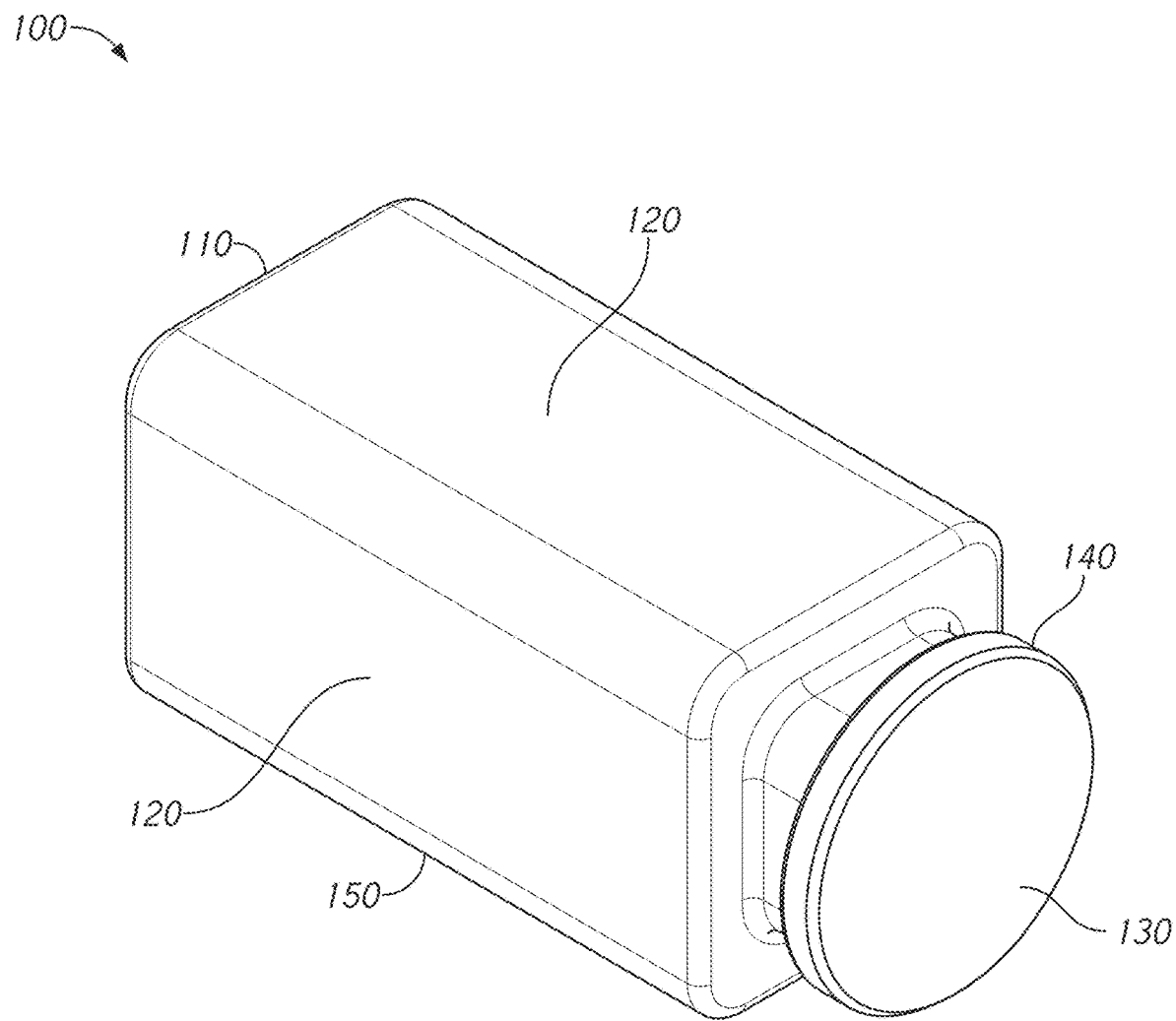

| | | | |
|---|---|---|---|
| 4,529,633 A | 7/1985 | Karlsson et al. |
| 4,781,315 A | 11/1988 | Nordskog |
| 4,791,963 A | 12/1988 | Gronert |
| 4,816,031 A | 3/1989 | Pfoff |
| 4,845,755 A | 7/1989 | Busch et al. |
| 4,918,737 A | 4/1990 | Luethi |
| 5,079,629 A | 1/1992 | Oz |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,598,846 A | 2/1997 | Peszynski |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,815,126 A | 9/1998 | Fan et al. |
| 5,913,815 A | 6/1999 | Ball et al. |
| 5,915,588 A | 6/1999 | Stoken et al. |
| 6,020,920 A | 2/2000 | Anderson |
| 6,028,413 A | 2/2000 | Brockmann |
| 6,076,927 A | 6/2000 | Owens |
| 6,091,546 A | 7/2000 | Spitzer |
| 6,115,482 A * | 9/2000 | Sears .............. G06F 3/011 |
| | | | 348/62 |
| 6,120,146 A | 9/2000 | Harris |
| 6,157,291 A | 12/2000 | Kuenster et al. |
| 6,174,058 B1 * | 1/2001 | Hsiao ............... A42B 1/062 |
| | | | 2/10 |
| 6,206,543 B1 | 3/2001 | Henry |
| 6,209,830 B1 | 4/2001 | Brotz |
| 6,215,460 B1 | 4/2001 | Mizoguchi et al. |
| 6,275,681 B1 | 8/2001 | Vega et al. |
| 6,282,302 B1 | 8/2001 | Hara |
| 6,317,039 B1 | 11/2001 | Thomason et al. |
| 6,467,929 B2 | 10/2002 | Lee |
| 6,604,837 B2 | 8/2003 | Sandberg et al. |
| 6,657,673 B2 | 12/2003 | Ishikawa et al. |
| 6,697,117 B1 | 2/2004 | Park |
| 6,704,044 B1 | 3/2004 | Foster et al. |
| 6,711,744 B1 | 3/2004 | Hockenbury |
| 6,717,737 B1 | 4/2004 | Haglund et al. |
| 6,733,150 B1 | 5/2004 | Hanley et al. |
| 6,735,897 B1 | 5/2004 | Schmitter |
| 6,783,238 B1 | 8/2004 | Stepper |
| 6,809,358 B2 | 10/2004 | Hsieh et al. |
| 6,819,354 B1 | 11/2004 | Foster et al. |
| 6,933,981 B1 | 8/2005 | Kishida et al. |
| 6,977,479 B2 | 12/2005 | Hsu |
| 7,003,353 B1 | 2/2006 | Parkhouse |
| 7,043,041 B2 | 5/2006 | Hacek et al. |
| 7,092,763 B1 | 8/2006 | Griffith et al. |
| 7,126,558 B1 | 10/2006 | Dempski |
| 7,129,986 B2 | 10/2006 | Wang |
| D531,656 S | 11/2006 | Della |
| 7,158,096 B1 | 1/2007 | Spitzer |
| 7,163,309 B2 | 1/2007 | Sohn et al. |
| 7,172,283 B1 | 2/2007 | Asta |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| D643,867 S | 8/2011 | Boland |
| 7,988,283 B2 | 8/2011 | Jannard |
| 8,011,783 B1 | 9/2011 | Leblang |
| 8,046,948 B2 | 11/2011 | Mauch et al. |
| 8,063,934 B2 | 11/2011 | Donato et al. |
| 8,068,169 B2 | 11/2011 | Chang |
| D650,411 S | 12/2011 | Fuchs |
| 8,077,029 B1 | 12/2011 | Daniel et al. |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| 8,228,299 B1 | 7/2012 | Maloney et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,461,983 B2 | 6/2013 | McCauley et al. |
| 8,469,508 B2 | 6/2013 | Silver et al. |
| 8,473,004 B2 | 6/2013 | Warren |
| 8,493,287 B2 | 7/2013 | Yamamoto |
| 8,519,834 B2 | 8/2013 | Jersa et al. |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,593,570 B2 | 11/2013 | Boland |
| 8,653,909 B2 | 2/2014 | Park et al. |
| 8,670,027 B1 | 3/2014 | Schaffer |
| D702,202 S | 4/2014 | Fisher |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| D712,452 S | 9/2014 | Fuchs |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,847,930 B2 | 9/2014 | Boyd et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,918,919 B2 | 12/2014 | Scholz |
| 8,922,161 B2 | 12/2014 | Choi et al. |
| D720,800 S | 1/2015 | Shin |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,953,827 B2 | 2/2015 | Sacha et al. |
| 8,957,629 B2 | 2/2015 | Ryu et al. |
| 8,970,689 B2 | 3/2015 | Campbell et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |

(56) References Cited

U.S. PATENT DOCUMENTS

| | | |
|---|---|---|
| 9,088,171 B2 | 7/2015 | Won et al. |
| D737,889 S | 9/2015 | Yoo |
| 9,122,083 B2 | 9/2015 | Blum et al. |
| 9,124,796 B2 | 9/2015 | Blum |
| D741,943 S | 10/2015 | Keplinger |
| 9,152,130 B2 | 10/2015 | Pattikonda et al. |
| D742,372 S | 11/2015 | Christopher et al. |
| D743,477 S | 11/2015 | Strecker |
| D743,479 S | 11/2015 | Keplinger |
| 9,185,278 B2 * | 11/2015 | Waters .................. H04N 13/207 |
| D745,922 S | 12/2015 | Shen |
| D746,358 S | 12/2015 | Markovitz et al. |
| D755,787 S | 5/2016 | Zander et al. |
| 9,344,816 B2 | 5/2016 | Larsen et al. |
| 9,380,374 B2 | 6/2016 | Sprague et al. |
| 9,386,832 B2 | 7/2016 | Elgan |
| D763,951 S | 8/2016 | Chae |
| D765,765 S | 9/2016 | Clegg |
| D766,770 S | 9/2016 | Devaney et al. |
| D767,013 S | 9/2016 | Hsu |
| D767,014 S | 9/2016 | Fuchs |
| 9,461,501 B2 | 10/2016 | Partovi et al. |
| D772,330 S | 11/2016 | Hsu |
| 9,609,902 B2 * | 4/2017 | Waters ..................... A42B 1/244 |
| 9,612,506 B1 | 4/2017 | Webb et al. |
| 9,628,707 B2 | 4/2017 | Blum et al. |
| 9,635,222 B2 | 4/2017 | Blum |
| D787,582 S | 5/2017 | Desodt et al. |
| 9,823,494 B2 | 11/2017 | Blum et al. |
| 9,930,257 B2 | 3/2018 | Blum et al. |
| 10,185,163 B2 | 1/2019 | Blum et al. |
| 10,218,884 B2 * | 2/2019 | Longbotham ........ H04N 13/239 |
| 10,241,351 B2 | 3/2019 | Blum et al. |
| 10,348,965 B2 | 7/2019 | Blum et al. |
| 10,419,648 B2 | 9/2019 | Fuller et al. |
| 10,481,471 B2 | 11/2019 | Zeng |
| 10,620,459 B2 | 4/2020 | Blum et al. |
| 10,863,060 B2 | 12/2020 | Kokonaski et al. |
| 10,887,516 B2 | 1/2021 | Blum et al. |
| 2001/0026684 A1 | 10/2001 | Sorek et al. |
| 2001/0041073 A1 | 11/2001 | Sorek et al. |
| 2002/0118279 A1 | 8/2002 | Spoonhower et al. |
| 2002/0170147 A1 | 11/2002 | Heller |
| 2003/0016284 A1 | 1/2003 | Squilla et al. |
| 2003/0044180 A1 | 3/2003 | Lindberg |
| 2003/0053608 A1 | 3/2003 | Ohmae et al. |
| 2003/0117521 A1 | 6/2003 | Nagaoka |
| 2003/0122958 A1 | 7/2003 | Olita et al. |
| 2003/0174242 A1 | 9/2003 | Carmi et al. |
| 2003/0206099 A1 | 11/2003 | Richman et al. |
| 2004/0008157 A1 | 1/2004 | Brubaker et al. |
| 2004/0013279 A1 | 1/2004 | Takeda et al. |
| 2004/0033058 A1 | 2/2004 | Reich |
| 2004/0080299 A1 | 4/2004 | Forster et al. |
| 2004/0088051 A1 | 5/2004 | Seligman |
| 2004/0200868 A1 | 10/2004 | Woodman |
| 2004/0221370 A1 | 11/2004 | Hannula et al. |
| 2004/0262342 A1 | 12/2004 | Pringle |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0096084 A1 | 5/2005 | Pohja et al. |
| 2005/0167558 A1 | 8/2005 | Smith |
| 2005/0201584 A1 | 9/2005 | Smith et al. |
| 2005/0225443 A1 | 10/2005 | Lerg et al. |
| 2005/0248717 A1 | 11/2005 | Howell et al. |
| 2006/0004546 A1 | 1/2006 | Slanec |
| 2006/0008257 A1 | 1/2006 | Mahashin et al. |
| 2006/0023158 A1 | 2/2006 | Howell et al. |
| 2006/0034478 A1 | 2/2006 | Davenport |
| 2006/0038917 A1 | 2/2006 | Funato et al. |
| 2006/0048286 A1 | 3/2006 | Donato et al. |
| 2006/0055786 A1 | 3/2006 | Ollila |
| 2006/0082730 A1 | 4/2006 | Franks |
| 2006/0095128 A1 | 5/2006 | Blum et al. |
| 2006/0121639 A1 | 6/2006 | Tai et al. |
| 2006/0121950 A1 | 6/2006 | Lee et al. |
| 2006/0215393 A1 | 9/2006 | VanderSchuit et al. |
| 2006/0248251 A1 | 11/2006 | Tracy et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0109768 A1 | 5/2007 | Sohn et al. |
| 2007/0153639 A1 | 7/2007 | Lafever et al. |
| 2007/0159810 A1 | 7/2007 | Kim et al. |
| 2007/0201861 A1 | 8/2007 | Coulman et al. |
| 2007/0291165 A1 | 12/2007 | Wang |
| 2008/0001735 A1 | 1/2008 | Tran et al. |
| 2008/0034637 A1 | 2/2008 | Summers |
| 2008/0088791 A1 | 4/2008 | Smith |
| 2008/0107414 A1 | 5/2008 | Showalter et al. |
| 2008/0116847 A1 | 5/2008 | Loke et al. |
| 2008/0117328 A1 | 5/2008 | Daoud et al. |
| 2008/0137589 A1 | 6/2008 | Barrett et al. |
| 2008/0137890 A1 | 6/2008 | Petersen et al. |
| 2008/0163536 A1 | 7/2008 | Koch et al. |
| 2008/0180537 A1 | 7/2008 | Weinberg et al. |
| 2008/0183028 A1 | 7/2008 | Guillen et al. |
| 2008/0192114 A1 | 8/2008 | Pearson et al. |
| 2008/0208335 A1 | 8/2008 | Blum et al. |
| 2008/0231721 A1 | 9/2008 | Chou et al. |
| 2008/0239232 A1 | 10/2008 | Guerrero |
| 2008/0259269 A1 | 10/2008 | Grogan et al. |
| 2008/0301846 A1 | 12/2008 | Brillouet |
| 2009/0009410 A1 | 1/2009 | Dolgin et al. |
| 2009/0031069 A1 | 1/2009 | Habuto et al. |
| 2009/0038056 A1 | 2/2009 | Bobbin et al. |
| 2009/0040308 A1 | 2/2009 | Temovskiy |
| 2009/0110386 A1 | 4/2009 | Kamada et al. |
| 2009/0169120 A1 | 7/2009 | Otani |
| 2009/0173760 A1 | 7/2009 | Good |
| 2009/0189981 A1 | 7/2009 | Siann et al. |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0262205 A1 | 10/2009 | Smith |
| 2009/0264966 A1 | 10/2009 | Blum et al. |
| 2009/0271243 A1 | 10/2009 | Sholl et al. |
| 2009/0273755 A1 | 11/2009 | Laventure |
| 2009/0307828 A1 | 12/2009 | Ludlow |
| 2009/0322512 A1 | 12/2009 | Fredrick et al. |
| 2010/0017578 A1 | 1/2010 | Månsson et al. |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0073478 A1 | 3/2010 | Kalous |
| 2010/0077334 A1 | 3/2010 | Yang et al. |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0214767 A1 | 8/2010 | Waters et al. |
| 2010/0245585 A1 | 9/2010 | Fisher et al. |
| 2010/0245757 A1 | 9/2010 | Sugihara et al. |
| 2010/0264872 A1 | 10/2010 | Kwong |
| 2010/0265655 A1 | 10/2010 | Metzler et al. |
| 2010/0284683 A1 | 11/2010 | Fressola et al. |
| 2010/0287683 A1 | 11/2010 | Neal |
| 2010/0287685 A1 | 11/2010 | Peterson et al. |
| 2010/0313335 A1 | 12/2010 | Waters et al. |
| 2010/0319096 A1 | 12/2010 | Scott et al. |
| 2011/0074349 A1 | 3/2011 | Ghovanloo |
| 2011/0085041 A1 * | 4/2011 | Kildevaeld ............ H04N 7/181 |
| | | 348/158 |
| 2011/0115429 A1 | 5/2011 | Toivola et al. |
| 2011/0121042 A1 | 5/2011 | Weiss |
| 2011/0156639 A1 | 6/2011 | Ryu et al. |
| 2011/0181238 A1 | 7/2011 | Soar |
| 2011/0184320 A1 | 7/2011 | Shipps et al. |

(56) References Cited

U.S. PATENT DOCUMENTS

| | | |
|---|---|---|
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2011/0261176 A1 | 10/2011 | Monaghan, Sr. et al. |
| 2012/0032631 A1 | 2/2012 | Bourilkov et al. |
| 2012/0050607 A1 | 3/2012 | Sims et al. |
| 2012/0062173 A1 | 3/2012 | Choi et al. |
| 2012/0066351 A1 | 3/2012 | Choi et al. |
| 2012/0075571 A1 | 3/2012 | Silver |
| 2012/0077437 A1 | 3/2012 | Agevik et al. |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0130252 A1 | 5/2012 | Pohjanen et al. |
| 2012/0146575 A1 | 6/2012 | Armstrong et al. |
| 2012/0153903 A1 | 6/2012 | Kim et al. |
| 2012/0164943 A1 | 6/2012 | Bennett |
| 2012/0169272 A1 | 7/2012 | Khalepari |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0194419 A1 | 8/2012 | Osterhout et al. |
| 2012/0212593 A1 | 8/2012 | Na'aman et al. |
| 2012/0274680 A1 | 11/2012 | Hofman |
| 2012/0280575 A1 | 11/2012 | Kim et al. |
| 2012/0281961 A1 | 11/2012 | Forbes |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0307229 A1 | 12/2012 | Conroy et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0033610 A1 | 2/2013 | Osborn et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0047317 A1 | 2/2013 | Hanover et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chemokalov et al. |
| 2013/0062964 A1 | 3/2013 | Chemokalov et al. |
| 2013/0062965 A1 | 3/2013 | Chemokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0096382 A1 | 4/2013 | Alexander et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0120596 A1 | 5/2013 | Yau |
| 2013/0127410 A1 | 5/2013 | Park et al. |
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0148271 A1 | 6/2013 | Huang |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0163090 A1 | 6/2013 | Yu et al. |
| 2013/0174205 A1 | 7/2013 | Jacobsen et al. |
| 2013/0176626 A1 | 7/2013 | Heinrich et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0182002 A1 | 7/2013 | Macciola et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201162 A1 | 8/2013 | Cavilia |
| 2013/0201299 A1 | 8/2013 | Waters et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235226 A1 | 9/2013 | Karn et al. |
| 2013/0235234 A1 | 9/2013 | Cucci et al. |
| 2013/0235332 A1 | 9/2013 | Blum et al. |
| 2013/0240579 A1 | 9/2013 | Yu |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1 | 9/2013 | Belbey et al. |
| 2013/0252669 A1 | 9/2013 | Nhiayi |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0300204 A1 | 11/2013 | Partovi |
| 2013/0320736 A1 | 12/2013 | Teufel et al. |
| 2013/0322753 A1 | 12/2013 | Lim et al. |
| 2013/0329183 A1 | 12/2013 | Blum et al. |
| 2013/0343585 A1 | 12/2013 | Bennett et al. |
| 2014/0009627 A1 | 1/2014 | Tanaka et al. |
| 2014/0021796 A1 | 1/2014 | Song et al. |
| 2014/0022765 A1 | 1/2014 | Waters |
| 2014/0027521 A1 | 1/2014 | Pedicano et al. |
| 2014/0036127 A1 | 2/2014 | Pong et al. |
| 2014/0042824 A1 | 2/2014 | Fells et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0049636 A1 | 2/2014 | O'Donnell et al. |
| 2014/0053318 A1 | 2/2014 | Fitzgerald et al. |

(56) References Cited

U.S. PATENT DOCUMENTS

| | | |
|---|---|---|
| 2014/0058506 A1 | 2/2014 | Tai et al. |
| 2014/0062395 A1 | 3/2014 | Kwon |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidi et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0152576 A1 | 6/2014 | Kim et al. |
| 2014/0153760 A1 | 6/2014 | Newton et al. |
| 2014/0159503 A1 | 6/2014 | Murakami et al. |
| 2014/0159654 A1 | 6/2014 | Lee et al. |
| 2014/0159894 A1 | 6/2014 | Tropper et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0204235 A1 | 7/2014 | Wexler et al. |
| 2014/0223462 A1 | 8/2014 | Aimone et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267596 A1 | 9/2014 | Geerds |
| 2014/0267874 A1 | 9/2014 | Ratcliff et al. |
| 2014/0268008 A1 | 9/2014 | Howell et al. |
| 2014/0268017 A1 | 9/2014 | Sweis et al. |
| 2014/0270685 A1 | 9/2014 | Letke et al. |
| 2014/0270688 A1 | 9/2014 | Han et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0295918 A1 | 10/2014 | Grifoni et al. |
| 2014/0304891 A1 | 10/2014 | Waters et al. |
| 2014/0307902 A1 | 10/2014 | Ku et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0319927 A1 | 10/2014 | Cho et al. |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0345090 A1 | 11/2014 | Wang |
| 2014/0346888 A1 | 11/2014 | Kim et al. |
| 2014/0347006 A1 | 11/2014 | Kim et al. |
| 2014/0352033 A1 | 12/2014 | Bryan et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0361881 A1 | 12/2014 | Gillem et al. |
| 2014/0375246 A1 | 12/2014 | Boysen, III et al. |
| 2014/0375256 A1 | 12/2014 | Lee et al. |
| 2015/0009309 A1 | 1/2015 | Heinrich et al. |
| 2015/0009312 A1 | 1/2015 | Vema |
| 2015/0035991 A1 | 2/2015 | Sachs et al. |
| 2015/0036003 A1 | 2/2015 | Sakurai et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0076297 A1 | 3/2015 | Parrill |
| 2015/0086175 A1 | 3/2015 | Lorenzetti |
| 2015/0091389 A1 | 4/2015 | Bryne et al. |
| 2015/0102995 A1 | 4/2015 | Shen et al. |
| 2015/0103158 A1 | 4/2015 | Cornelius |
| 2015/0103304 A1 | 4/2015 | Darcy |
| 2015/0130935 A1 | 5/2015 | Siann |
| 2015/0137746 A1 | 5/2015 | Lee et al. |
| 2015/0141752 A1 | 5/2015 | Wilson et al. |
| 2015/0148599 A1 | 5/2015 | Wilson et al. |
| 2015/0010286 A1 | 6/2015 | Asanuma et al. |
| 2015/0168727 A1 | 6/2015 | Qaddoura |
| 2015/0168729 A1 | 6/2015 | Kobayashi |
| 2015/0173497 A1 | 6/2015 | Yu |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0241916 A1 | 8/2015 | Choi et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0261013 A1 | 9/2015 | Dobson et al. |
| 2015/2546021 | 9/2015 | Kwon et al. |
| 2015/0323858 A1 | 11/2015 | Stephens et al. |
| 2015/0326748 A1 | 11/2015 | Tisch et al. |
| 2015/0334258 A1 | 11/2015 | O'Neill |
| 2015/0355481 A1 | 12/2015 | Hilkes et al. |
| 2016/0025996 A1 | 1/2016 | Bacon |
| 2016/0026156 A1 | 1/2016 | Jackson et al. |
| 2016/0026240 A1 | 1/2016 | Wexler et al. |
| 2016/0026853 A1 | 1/2016 | Wexler |
| 2016/0033792 A1 | 2/2016 | Blum et al. |
| 2016/0037025 A1 | 2/2016 | Blum |
| 2016/0048160 A1 | 2/2016 | Haddick |
| 2016/0054645 A1 | 2/2016 | Contino et al. |
| 2016/0066656 A1 | 3/2016 | Ferris |
| 2016/0072296 A1 | 3/2016 | Nejatali et al. |
| 2016/0104284 A1 | 4/2016 | Maguire et al. |
| 2016/0104451 A1 | 4/2016 | Sahin |
| 2016/0119520 A1 | 4/2016 | Park |
| 2016/0125656 A1 | 5/2016 | James et al. |
| 2016/0131963 A1 | 5/2016 | Clearman |
| 2016/0154239 A9 | 6/2016 | Layson, Jr. |
| 2016/0158082 A1 | 6/2016 | Gainor et al. |
| 2016/0172870 A1 | 6/2016 | Blum et al. |
| 2016/0174669 A1 | 6/2016 | Ferris |
| 2016/0182826 A1 | 6/2016 | Blum et al. |
| 2016/0190859 A1 | 6/2016 | Blum et al. |
| 2016/0195798 A1 | 7/2016 | Nenov |
| 2016/0203359 A1 | 7/2016 | von und zu Liechtenstein |
| 2016/0206056 A1 | 7/2016 | Pluemer et al. |
| 2016/0223886 A1 | 8/2016 | Bellerive et al. |
| 2016/0225191 A1 | 8/2016 | Mullins |
| 2016/0261147 A1 | 9/2016 | Blum et al. |
| 2016/0273703 A1 | 9/2016 | Li |
| 2016/0277649 A1 | 9/2016 | Katz et al. |
| 2016/0294225 A1 | 10/2016 | Blum et al. |
| 2016/0349533 A1 | 12/2016 | Grassi |
| 2016/0360161 A1* | 12/2016 | Fitzgerald ............ H04N 5/2251 |
| 2016/0363787 A1 | 12/2016 | Blum et al. |
| 2017/0006225 A1 | 1/2017 | Fu |
| 2017/0010698 A1 | 1/2017 | Ibragimova et al. |
| 2017/0055072 A1 | 2/2017 | Kim et al. |
| 2017/0024612 A1 | 3/2017 | Sood et al. |
| 2017/0069192 A1 | 3/2017 | Sood et al. |

(56) References Cited

U.S. PATENT DOCUMENTS

| | | | |
|---|---|---|---|
| 2017/0127196 A1 | 5/2017 | Blum et al. |
| 2017/0134645 A1 | 5/2017 | Kim et al. |
| 2017/0146894 A1 | 5/2017 | Kubotera et al. |
| 2017/0150049 A1 | 5/2017 | Blum et al. |
| 2017/0163840 A1 | 6/2017 | Ito et al. |
| 2017/0195529 A1 | 7/2017 | Blum |
| 2017/0216099 A1* | 8/2017 | Saladino ............... A42B 3/185 |
| 2017/0223236 A1 | 8/2017 | Oberlander et al. |
| 2017/0250722 A1 | 8/2017 | Lee et al. |
| 2017/0272640 A1 | 9/2017 | Fuller et al. |
| 2017/0285754 A1 | 10/2017 | Holman et al. |
| 2017/0329365 A1 | 11/2017 | Wong et al. |
| 2017/0349116 A1 | 12/2017 | Liao |
| 2017/0363885 A1 | 12/2017 | Blum et al. |
| 2017/0370522 A1 | 12/2017 | Schield |
| 2018/0020193 A1 | 1/2018 | Blum et al. |
| 2018/0042369 A1 | 2/2018 | Blum et al. |
| 2018/0063433 A1 | 3/2018 | Blum et al. |
| 2018/0088355 A1 | 3/2018 | Blum et al. |
| 2018/0103195 A1 | 4/2018 | Kim et al. |
| 2018/0115691 A1 | 4/2018 | Blum et al. |
| 2018/0116384 A1 | 5/2018 | Blum et al. |
| 2018/0129078 A1* | 5/2018 | Blum ..................... G02C 11/00 |
| 2018/0131847 A1 | 5/2018 | Kokonaski et al. |
| 2018/0143458 A1 | 5/2018 | Blum et al. |
| 2018/0249079 A1 | 8/2018 | Blum et al. |
| 2018/0249094 A1 | 8/2018 | Fuller et al. |
| 2018/0262055 A1 | 9/2018 | Schoenbart et al. |
| 2018/0295264 A1 | 10/2018 | Fuller et al. |
| 2018/0295328 A1 | 10/2018 | Tucker |
| 2019/0235356 A1 | 8/2019 | Fuller et al. |
| 2019/0258061 A1* | 8/2019 | Solomon ............ G02B 27/0176 |
| 2019/0313025 A1 | 10/2019 | Blum et al. |
| 2020/0041822 A1 | 2/2020 | Blum et al. |
| 2020/0329177 A1 | 10/2020 | Greaves et al. |

FOREIGN PATENT DOCUMENTS

| | | |
|---|---|---|
| CN | 2850160 Y | 12/2006 |
| CN | 200972550 Y | 11/2007 |
| CN | 101529899 A | 9/2009 |
| CN | 201318005 | 9/2009 |
| CN | 202033546 U | 11/2011 |
| CN | 202043207 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 103036282 A | 4/2013 |
| CN | 202904151 U | 4/2013 |
| CN | 203084344 U | 7/2013 |
| CN | 2013118162 A1 | 8/2013 |
| CN | 203178585 | 9/2013 |
| CN | 203708487 U | 7/2014 |
| CN | 104273891 A | 1/2015 |
| CN | 204101814 U | 1/2015 |
| CN | 204420521 U | 6/2015 |
| CN | 204498235 | 7/2015 |
| CN | 10625848 A | 11/2016 |
| CN | 205812179 U | 12/2016 |
| CN | 206115346 U | 4/2017 |
| CN | 106817455 A | 6/2017 |
| DE | 202009015991 | 4/2010 |
| EP | 0736268 | 10/1996 |
| ES | 2165795 | 3/2002 |
| GB | 2472120 A | 1/2011 |
| JP | 07099596 A | 4/1995 |
| JP | H08505238 A | 6/1996 |
| JP | 2000138858 A | 5/2000 |
| JP | 4006856 B2 | 11/2007 |
| JP | 2008067285 A | 3/2008 |
| JP | 3150547 U | 4/2009 |
| JP | 2012063641 A | 3/2012 |
| JP | 2017013087 A | 1/2017 |
| JP | 2017013088 A | 1/2017 |
| JP | 2017013089 A | 1/2017 |
| JP | 2017013090 A | 1/2017 |
| JP | 2017013091 A | 1/2017 |
| JP | 2017013092 A | 1/2017 |
| JP | 2017120333 A2 | 7/2017 |
| KR | 1020090047255 A | 5/2009 |
| KR | 1020140053341 A | 5/2014 |
| KR | 101421046 B1 | 7/2014 |
| KR | 1020140091195 A | 7/2014 |
| KR | 20150071892 | 6/2015 |
| KR | 101646541 | 8/2016 |
| TW | M300818 U | 11/2006 |
| TW | 200843277 A | 11/2008 |
| TW | 201036430 A | 10/2010 |
| TW | M395176 U | 12/2010 |
| TW | 201145748 A1 | 12/2011 |
| TW | 201415753 A | 4/2014 |
| TW | 201520976 A | 6/2015 |
| TW | 201610506 A | 3/2016 |
| WO | WO 9208157 A1 | 5/1992 |
| WO | WO 1999/26411 A1 | 5/1999 |
| WO | WO 0106298 A1 | 1/2001 |
| WO | WO 02/45044 A1 | 6/2002 |
| WO | WO 2009018391 A1 | 2/2009 |
| WO | WO 2009/052705 A1 | 4/2009 |
| WO | WO 2010137495 A1 | 12/2010 |
| WO | WO 2011/041733 A1 | 4/2011 |
| WO | WO 2012/039738 A1 | 3/2012 |
| WO | WO 2012/093986 A1 | 7/2012 |
| WO | WO 2013/118162 A1 | 8/2013 |
| WO | WO 2013/188343 A1 | 12/2013 |
| WO | WO 2014/012451 A1 | 1/2014 |
| WO | WO 2014/012536 A1 | 1/2014 |
| WO | WO 2014/045571 A1 | 3/2014 |
| WO | WO 2014/102536 A1 | 7/2014 |
| WO | WO 2014/122538 A2 | 8/2014 |
| WO | WO 2014/161083 A1 | 10/2014 |
| WO | WO 2015/029215 A1 | 3/2015 |
| WO | WO 2015/049526 A1 | 4/2015 |
| WO | WO 2015/157569 A1 | 10/2015 |
| WO | WO 2016/022499 A1 | 2/2016 |
| WO | WO 2016/100339 A1 | 6/2016 |
| WO | WO 2016/105480 A1 | 6/2016 |
| WO | WO 2016/109577 A1 | 7/2016 |
| WO | WO 2016/141349 A1 | 9/2016 |
| WO | WO 2016/201261 A1 | 12/2016 |
| WO | WO 2016/205373 A1 | 12/2016 |
| WO | WO 2017/075405 A1 | 5/2017 |
| WO | WO 2017/146753 A1 | 8/2017 |
| WO | WO 2017/223042 A1 | 12/2017 |
| WO | WO 2018/0017586 A1 | 1/2018 |
| WO | WO 2018/031684 A1 | 2/2018 |
| WO | WO 2018/031684 A1 | 2/2018 |

(56) References Cited

FOREIGN PATENT DOCUMENTS

| WO | WO 2018/075916 A1 | 4/2018 |
|---|---|---|
| WO | WO 2018/089533 A1 | 5/2018 |
| WO | WO 2018/165622 A1 | 9/2018 |

OTHER PUBLICATIONS

"Alpha—The World's Smallest 4K Action Camera", https://www.indiegogo.com/projects/alpha-the-world-s-smallest-4k-action-camera-sports; captured Oct. 9, 2017, pp. all.

Blum, Ronald D. et al., U.S. Appl. No. 15/337,796, entitled "Hearing Aid Adapted for Wireless Power Reception", filed Oct. 28, 2016, pp. all.

CAMSOY C1 Wearable Body micro camera Wireless, Nov. 15, 2016, http://euro.gr/products/camsoy-c1-wearable-body-micro-camera-wireless-mini-dv-ip-magnetic-hd720p-compatible-with-gopro-accessories-bike-wifi-mini-camera/.

"Classi: the World's First Leather Smart Strap for Classic Watches", http://www.maintool.me/classi.html; captured Nov. 10, 2016, pp. all.

CT Band "Make Your Watch Smart", http://www.ct-band.com/en/; captured Nov. 10, 2016, pp. all.

Extended European Search Report received for EP Appl. No. 15829271.4, dated Mar. 21, 2018, pp. all.

Extended European Search Report received for EP Appl. No. 15873769.2 dated Jul. 11, 2018, pp. all.

First Office Action for KR Application No. 10-2017-7006054, dated Feb. 28, 2018, pp. all.

First Office Action for RU Application No. 2017106629, dated Mar. 22, 2018, pp. all.

First Office Action for Taiwan Appliation No. 106104281, dated Dec. 28, 2017, pp. all.

"Glance: World's First Smart Accessory for Your Watch", https://www.kickstarter.com/projects/1742184757/glance-worlds-first-smart-accessory-for-your-watch; captured Nov. 10, 2016, pp. all.

Griffin "Sleepsport Band", http://www.officesupplynow.com/xcart/GRFGB40139-Griffin-Case-sleepsport-Band-bk.html?gclid=CjwKEAjwebABRCjpvr13dHL8DsSJABB-ILJBcOqYMmKeCs3g_rcvbST3HVWtuup_HzVQ3-lv5YFOBoCcK_w_wcB; captured Nov. 10, 2016, pp. all.

"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, pp. 1-16.

Kairos, "Kairos T-Band Only", https://kairoswatches.com/tbands/tband/; captured Nov. 10, 2016, pp. all.

Lynnette "Fitbit Pouch for Watch Strap", https://www.etsy.com/listing/186507712/fitbit-pouch-for-watch-strap; captured Nov. 10, 2016, pp. all.

"Marathon Watch Band Clip Compass", http://www.chronoworld.com/marathon-watch-band-clip-compass-co194004.html; captured Nov. 10, 2016, pp. all.

"Modillion Turns Any "Dumb" Watch Into a Smart Watch", http://newatlas.com/modillian-smartwatch-strap/32059/; captured Nov. 10, 2016, pp. all.

Montblac-Simplo GMBH "Wearable Technology Meets the Art of Fine Watchmaking", http://www.montblanc.com/en-US/discover/specials/montblanc-introduces-e-strap.html; captured Nov. 10, 2016, pp. all.

"Multi Functional Pouch Armband Ankel Band Wristband for Fitbit Flex Fitbit One Clip . . .", https://www.amazon.com/functional-armband-wristband-smartband-withings/dp/B00WALZXCW; captured Nov. 10, 2016, pp. all.

Multi Use Portable Ultra Hd 720P WIFI Control Wireless Camera/Action Camera, Dec. 18, 2016, https://www.amazon.com/Portable-Control-Wireless-Camera-Action/dp/B01MYTYAH1.

Nico Gerard "Skyview Pinnacle", https://www.nicogerard.com/nico-gerard-skyview-pinnacle; captured Nov. 10, 2016, pp. all.

ON Camera SnapCam Wearable HD Camera, Oct. 18, 2015, https://www.amazon.com/iON-Camera-SnapCam-Wearable-Bluetooth/dp/B012X08L0A.

Pogocam: Capture Life in the Moment With a Camera for Glasses http://web.archive.org/web/20171101052751/https://pogofec.com/products/pogocam Oct. 2017, pp. all.

Pogo-Cam, Nov. 28, 2016, http://www.pogotec.com/pogo-cam/.

Potensic Digital Endoscope Borescope Review, John TechReview, Aug. 5, 2015, https://www.youtube.com/watch?v=y_Gw_sc2dh8.

"Review of 1Bandid Sports & GPS Watch ID Bands", https://www.dcrainmaker.com/2011/09/review-of-1bandid-sports-gps-watch-id.html; captured Nov. 10, 2016, pp. all.

"Skyview Pinnacle", https://www.nicogerard.com/nico-gerard-skyview-pinnacle; captured Nov. 10, 2016, pp. all.

Smid, Peter "Chapter 1: Part Program Development", www.globalspec.com/reference/56201/203279/chapter-1-program-development.com ; published Dec. 29, 2011; pp. all.

Taser International, Inc. "Taser Axon Flex System User Manual", Taser International Inc., 2015, p. 1-21.

"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.

Tombot "Custom Watchband Holder for Fitbit Flex", http://www.shapeways.com/product/YWXHN5VYP/custom-watchband-holder-for-fitbit-flex?optionId+17995763; captured Nov. 10, 2016, pp. all.

Ubirds "Unique" Hand-Made Strap Discretely Adds Smart Features To Any Watch, http://newatlas.com/unique-smartwatch-strap/39458/; captured Nov. 10, 2016, pp. all.

Wotch "Transform Your Wristwatch Into a Smart Device", http://www.wotch.de/; captured Nov. 10, 2016, pp. all.

* cited by examiner

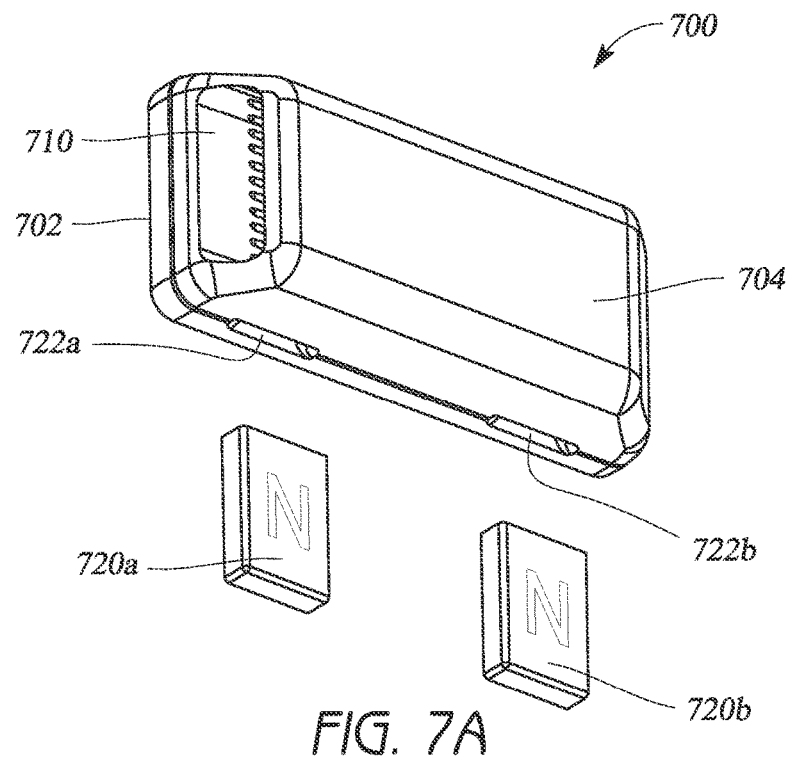
FIG. 7A
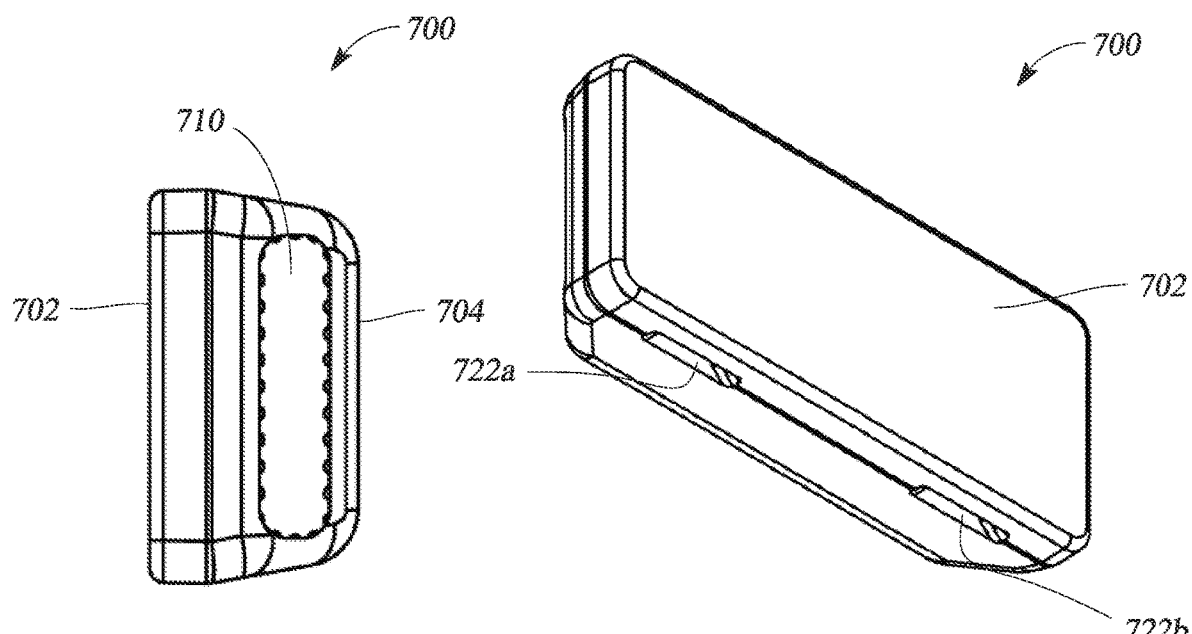
FIG. 7B
FIG. 7C

WEARABLE MOUNTS FOR PORTABLE CAMERA

INCORPORATION BY REFERENCE TO ANY PRIORITY APPLICATIONS

This application claims priority to U.S. Provisional Patent Application 62/760,915, filed Nov. 13, 2018, and entitled "MOUNTS FOR PORTABLE CAMERA." The foregoing application, and any other applications for which a foreign or domestic priority claim is identified in the Application Data Sheet as filed with the present application, are hereby incorporated by reference under 37 CFR 1.57.

BACKGROUND

Field

This disclosures relates to wearable mounts for portable cameras.

Description of the Related Art

Portable cameras are popular because they allow users to capture photographs and videos of loved ones and special moments. However, it is sometimes cumbersome to use portable cameras because they are often stowed in pockets or bags where they may not be immediately accessible. This relative lack of accessibility means there is a risk that a user may miss the opportunity to capture photographs or videos of some spontaneous moments. There is thus a need for improved ways for users to carry portable cameras in a more accessible manner.

SUMMARY

A ring mount for a portable camera, the ring mount comprising: a finger loop; and a camera mount configured to releasably secure a portable camera.

A necklace mount for a portable camera, the necklace mount comprising: a camera mount configured to releasably secure a portable camera; and a necklace hole, ring, or loop integrated with the camera mount.

A hat mount for a portable camera, the hat mount comprising: a hat; and a ferromagnetic plate or one or more magnets integrated into the hat to securely hold a portable camera via magnetic force with one or more magnets inside the camera.

An eyewear mount for a portable camera, the eyewear mount comprising: an outward-facing mounting surface; an inward-facing surface; an eyeglass temple channel between the outward-facing mounting surface and the inward-facing surface.

A hat mount for a portable camera, the hat mount comprising: a camera mounting surface; a clip portion; and a bridge that connects the camera mounting surface and the clip portion together with a gap therebetween.

BRIEF DESCRIPTION OF THE DRAWINGS

FIG. 1 is a rear perspective view of an example embodiment of a portable camera.

FIG. 2A is a front perspective view of an example embodiment of a ring mount for the portable camera shown in FIG. 1.

FIG. 2B is a side view of the ring mount.

FIG. 2C is a top view of the ring mount.

FIG. 2D is a front view of the ring mount.

FIG. 2E is a front perspective image of an example embodiment of the ring mount.

FIG. 2F is a rear perspective image of an example embodiment of the ring mount.

FIGS. 2G and 2H are side images of example embodiments of the ring mount.

FIG. 2I is a rear image of an example embodiment of the ring mount.

FIG. 2J is a front perspective image of an example embodiment of the ring mount with the camera shown in the inserted position.

FIG. 2K is a side image of an example embodiment of the ring mount that shows the camera as it is being inserted.

FIG. 2L is a front perspective image of an example embodiment of the ring mount which shows the camera aligned with the mount prior to insertion.

FIG. 3 is a front perspective image of an example embodiment of another ring mount.

FIG. 4 is a front perspective image of an example embodiment of yet another ring mount.

FIG. 5A illustrates an example embodiment of a necklace mount for the camera shown in FIG. 1.

FIG. 5B is a front perspective image of an example embodiment of the necklace mount that shows the camera inserted into the mount.

FIG. 5C is a side perspective image of an example embodiment of the necklace mount that likewise shows the camera inserted into the mount.

FIG. 5D is a side image of an example embodiment of the necklace mount.

FIG. 5E is a side perspective image of an example embodiment of the necklace mount.

FIG. 5F is a side perspective view of an example embodiment of an outer shell for the necklace mount.

FIGS. 5G and 5H are side views of the outer shell.

FIG. 5I is a cross-sectional view of the outer shell.

FIG. 5J is a rear perspective view of an example embodiment of an inner shell which is provided inside the outer shell.

FIG. 5K is a side view of the inner shell.

FIG. 5L is a side view of the inner shell with a cutaway which shows mounting projections.

FIG. 6 is a front view of a baseball-style hat with a camera mount integrated inside the bill.

FIG. 7A illustrates an example embodiment of an eyewear mount.

FIG. 7B is a side view of the eyewear mount.

FIG. 7C is a perspective view of the eyewear mount.

FIG. 7D is a top view of the eyewear mount.

FIG. 7E is a perspective view of the eyewear mount attached to a pair of eyeglasses.

FIG. 7F is a perspective view of the portable camera magnetically attached to the mounting surface of the eyewear mount, which is in turn attached to a pair of eyeglasses.

FIG. 8A illustrates an example embodiment of a removable hat mount.

FIG. 8B is an exploded view of the removable hat mount.

FIG. 8C is another exploded view of the removable hat mount.

FIG. 8D is a side view of the removable hat mount.

DETAILED DESCRIPTION

FIG. 1 is a rear perspective view of an example embodiment of a portable camera 100. Example embodiments of the portable camera are disclosed in U.S. patent application Ser.

No. 15/455,196, filed Mar. 10, 2017, and in U.S. patent application Ser. No. 15/904,380, filed Feb. 25, 2018, both of which are incorporated by reference herein. The camera 100 has a front light-transmissive surface 110, which can cover a lens for receiving light from the user's surroundings and capturing images and videos. The camera 100 also includes side surfaces 120. One of the side surfaces 120 can include one or more magnets 150 for attaching the camera 100 to a mount, as described in U.S. patent application Ser. No. 15/939,633, filed Mar. 29, 2018, which is incorporated by reference herein. A microphone opening can also be provided on one of the side surfaces 120. The camera 100 also has a rear surface 130, which can include one or more electrical contacts for connecting the camera 100 to a docking station. The camera 100 can also include a mounting flange 140. The mounting flange 140 can be used to help secure the camera 100 to a mount, as discussed further herein. In some embodiments, the camera 100 can be the Opkix One camera, available from Opkix, Inc.

A variety of wearable camera mounts are described herein. These wearable camera mounts can be used to provide users with the ability to wear the camera 100 and capture moments quickly and efficiently as they happen. A ring mount can be used to attach the camera 100 to the user's finger. The ring mount can be worn forward-facing to capture photos or videos of a friend or an activity. The ring mount can also be worn backward-facing, toward the user, to capture a "selfie." A necklace mount can be used to attach the camera 100 to the user's neck. The necklace mount gives the user the ability to capture spontaneous moments by simply picking up the camera and recording. A hat mount and an eyewear mount can be used to allow the user to carry the camera 100 in a hands-free fashion and to capture point-of-view footage.

Figure 2A:
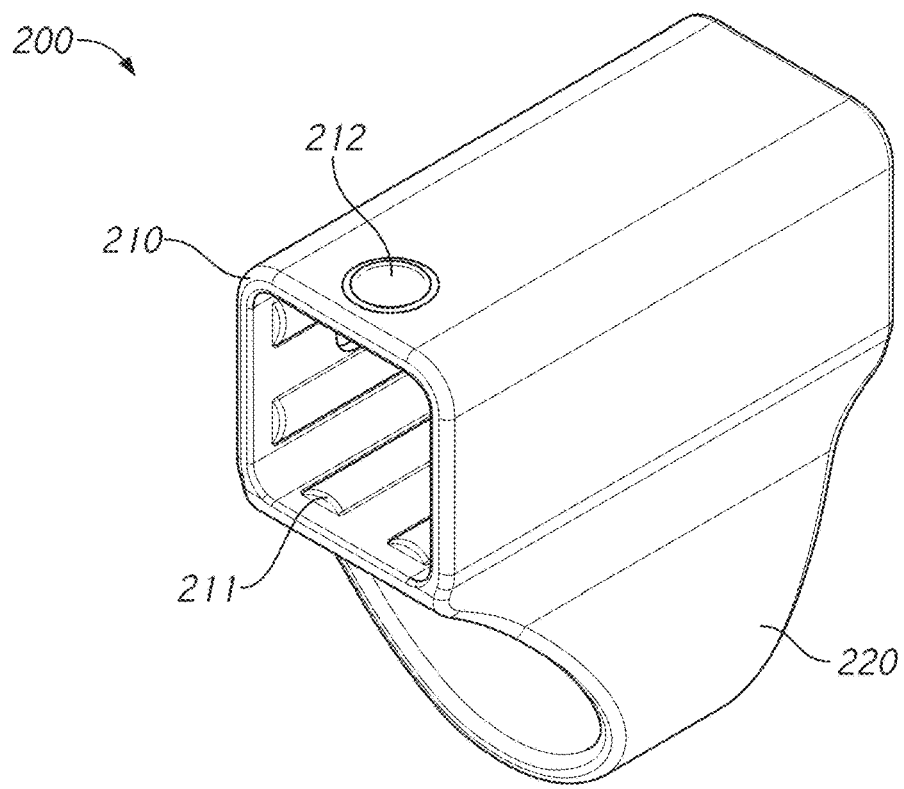

FIG. 2A is a front perspective view of an example embodiment of a ring mount 200. The ring mount 200 can be used to secure the camera 100 to a user's finger. The ring mount 200 includes a camera enclosure 210. In the illustrated embodiment, the camera enclosure 210 is sized and shaped as a receptacle to receive the camera 100 by inserting the rear of the camera through the illustrated front opening of the camera enclosure. The ring mount 200 can also include a finger loop 220. The ring mount 200 is worn by inserting a finger through the finger loop 220. The finger loop 220 can have a diameter of, for example, 15-25 mm, though other sizes can also be used. In some embodiments, the ring mount 200 is made of a resilient material, such as rubber or silicone. In such embodiments, the finger loop 220 can be sized smaller than the user's finger so as to stretch the resilient material when worn. The elasticity of the resilient material can allow the finger loop 220 to securely hold the ring mount 200 in place. Similarly, the camera enclosure 210 can be sized smaller than the dimensions of the camera so as to stretch the resilient material when the camera is inserted. The elasticity of the resilient material can thereby allow the camera enclosure to securely hold the camera 100 in place. In other embodiments, however, the ring mount 200 can be made of a hard material, such as plastic or metal.

In some embodiments, the interior of the camera enclosure 210 can include one or more longitudinal ribs 211. The ribs 211 can be made of a resilient material and can be used to securely hold the camera 100 in place within the camera enclosure 210.

The camera enclosure 210 can include a projection 212 on, for example, its top surface. The projection 212 can be located on the surface of the camera enclosure 210 so as to be aligned with a control button (e.g., on/off button, photo/video capture button, etc.), or other input device, on the camera 100 when the camera is fully inserted into the camera enclosure 210. In this way, the projection 212 provides a tactile indication of the location of the control button thereby facilitating operation of the camera 100 by the user even when the camera is in the camera enclosure 210 and the control button is not visible. While a projection 212 is illustrated, a depression could also be used. The projection 212 (or depression) can be made of a resilient material that allows applied pressure to be transmitted to the control button inside the camera enclosure 210.

Figure 2B:
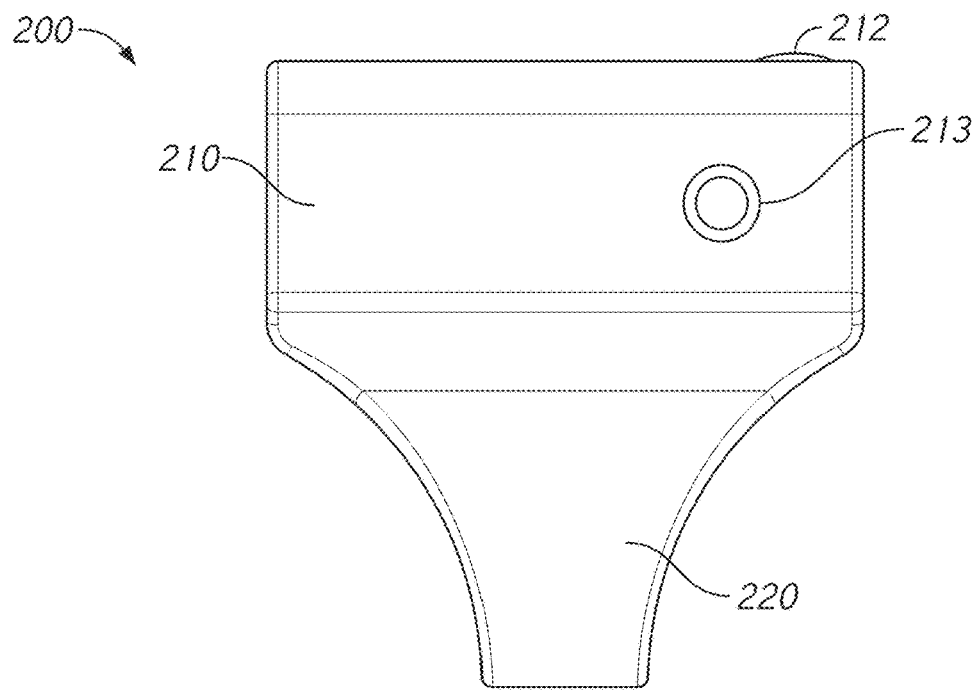

FIG. 2B is a side view of the ring mount 200. As shown in the side view, in some embodiments, the ring mount 200 can include an aperture 213 through one of the surfaces (e.g., a side surface) of the camera enclosure 210. The aperture 213 can be located at a position such that it is aligned with the microphone of the camera 100 when the camera is fully inserted into the camera enclosure 210. Thus, the aperture 213 can facilitate audio capture by the camera 100, even when the camera is in the camera enclosure 210, by allowing sound waves to pass through the aperture to the camera's microphone.

Figure 2C:
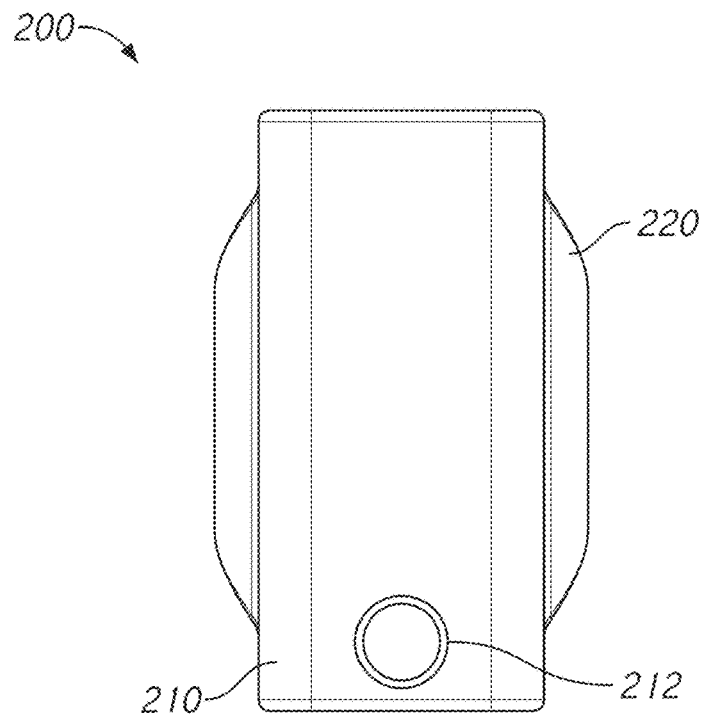

FIG. 2C is a top view of the ring mount 200. In this view, the top surface of the camera enclosure 210 is visible, as is the projection 212 which facilitates operation of one or more camera control buttons, as already discussed.

Figure 2D:
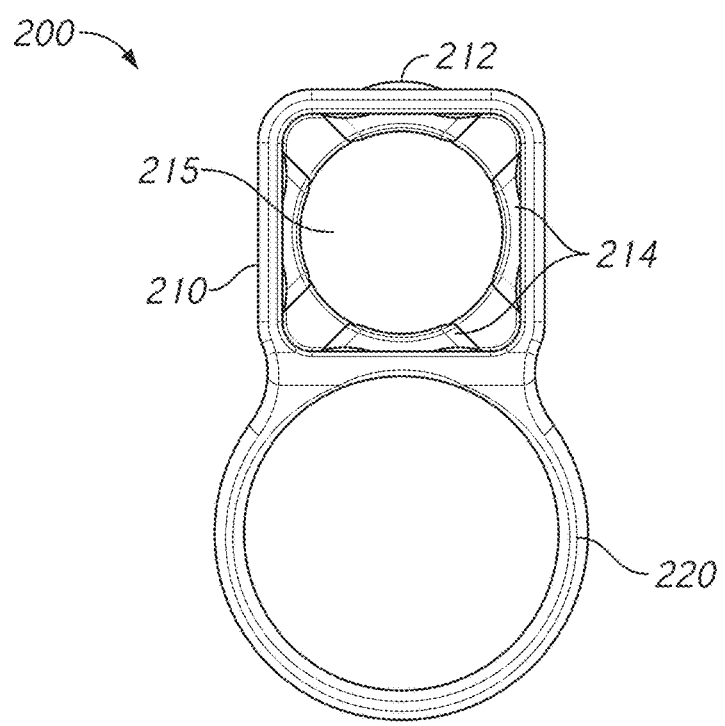

FIG. 2D is a front view of the ring mount 200. In this view, the front opening of the camera enclosure 210 is visible. The front opening of the camera enclosure 210 can have the same size and shape as a cross-section of the camera 100. The camera enclosure 210 can also include a rear opening 215, which is visible from the front view of the ring mount 200 by looking through the larger front opening of the camera enclosure 210. Mounting projections 214 are also visible by looking through the front opening of the camera enclosure 210. The mounting projections 214 can be made of a resilient material and can be provided near the rear surface of the camera enclosure 210. When the camera 100 is inserted into the camera enclosure 210, the mounting flange 140 is forced past the mounting projections 214 until the mounting flange 140 is ultimately positioned between the mounting projections 214 and the rear surface of the camera enclosure 210. The distance between the mounting projections 214 and the rear surface of the camera enclosure 210 can correspond to the thickness of the mounting flange 140, so as to securely hold the camera in place within the camera enclosure. The rear opening 215 of the camera enclosure 210 can be smaller than the rear surface 130 of the camera 100, so as to prevent the camera from exiting the back of the camera enclosure.

Figure 2E:
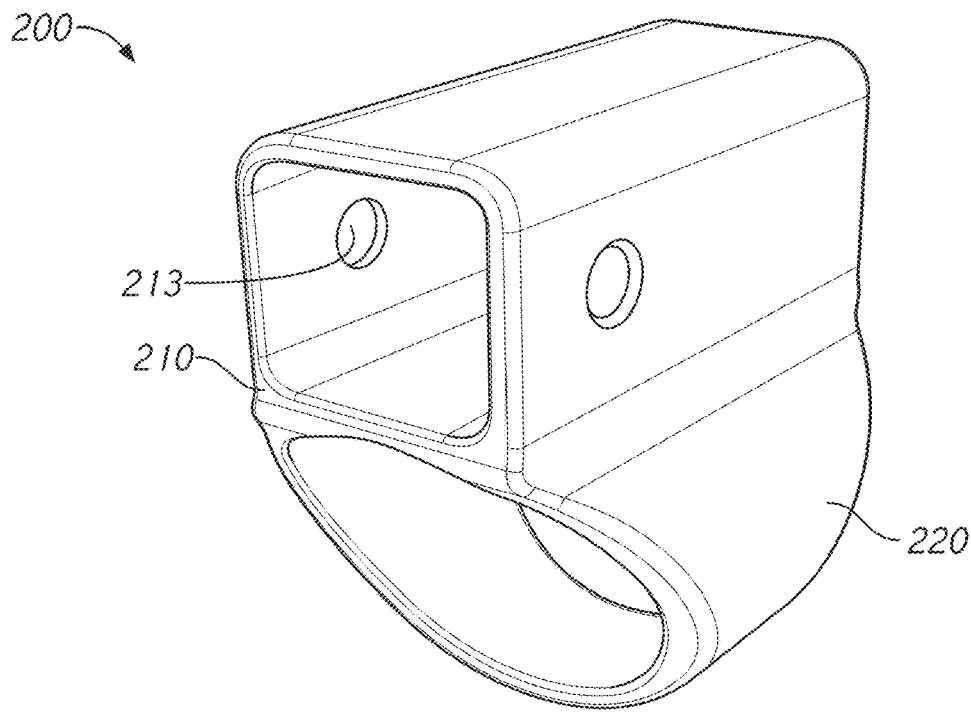

FIG. 2E is a front perspective image of an example embodiment of the ring mount 200. In this view, the front opening of the camera enclosure 210 is visible, as are two apertures 213 provided in the sidewalls of the camera enclosure. The locations of these apertures can correspond to the positions of a microphone or a button, or other input device, on the camera 100.

Figure 2F:
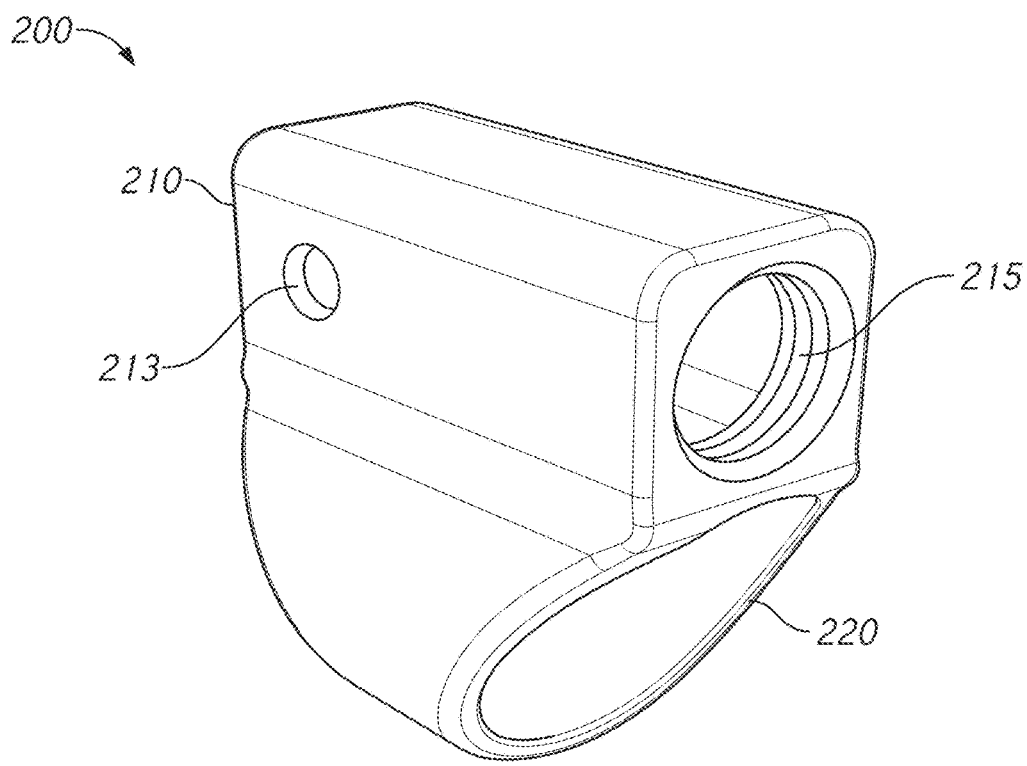

FIG. 2F is a rear perspective image of an example embodiment of the ring mount 200. In this view, the rear opening of the camera enclosure 210 is visible. The rear opening 215 is advantageous because it facilitates easy insertion, and removal, of the camera 100 into, and from, the camera enclosure 210. The rear opening 215 facilitates easy insertion because it allows air to escape from the camera enclosure 210 as the camera 100 is slid into the enclosure. The rear opening 215 facilitates easy removal because it allows air to enter the camera enclosure 210 as the camera 100 is removed from the enclosure, thereby preventing a suction effect from resisting removal of the camera. The rear opening 215 also allows finger access to help push the camera 100 out of the camera enclosure 210. In order to allow finger access, the rear opening 215 may have a width dimension of, for example, 10-20 mm, though other sizes can also be used. The raised ribs 211 (shown in FIG. 2A) can be used in addition to, or in place of, the rear opening 215 to facilitate insertion and removal of the camera 100 by allowing airflow around it. The airflow provided by the raised ribs 211 can also help prevent the camera 100 from overheating while it is in the camera enclosure 210.

Figure 2G:
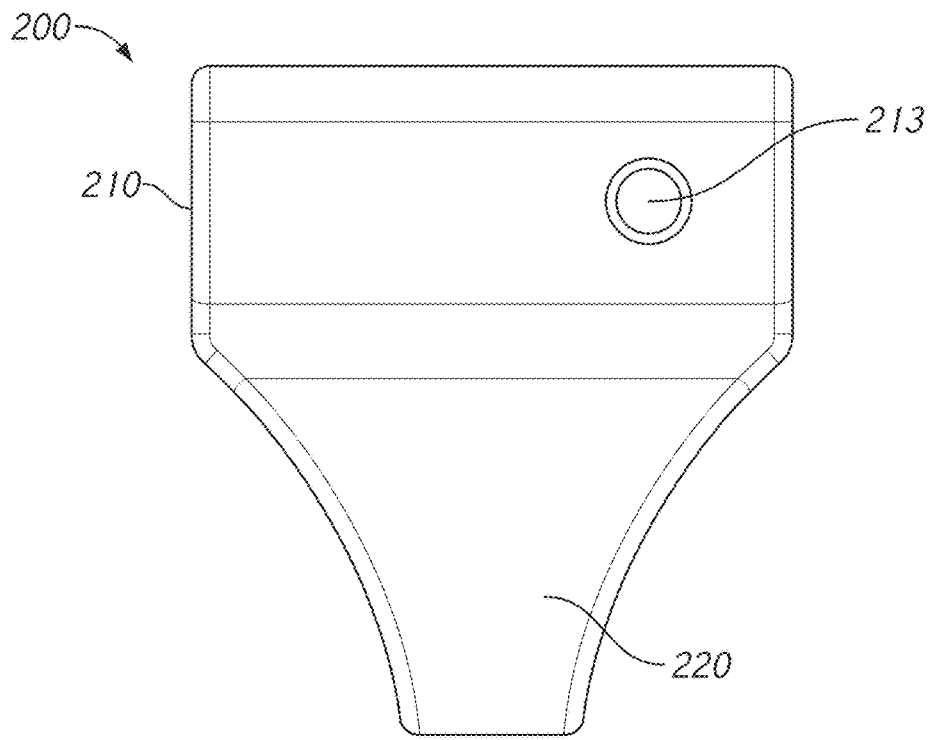
Figure 2H:
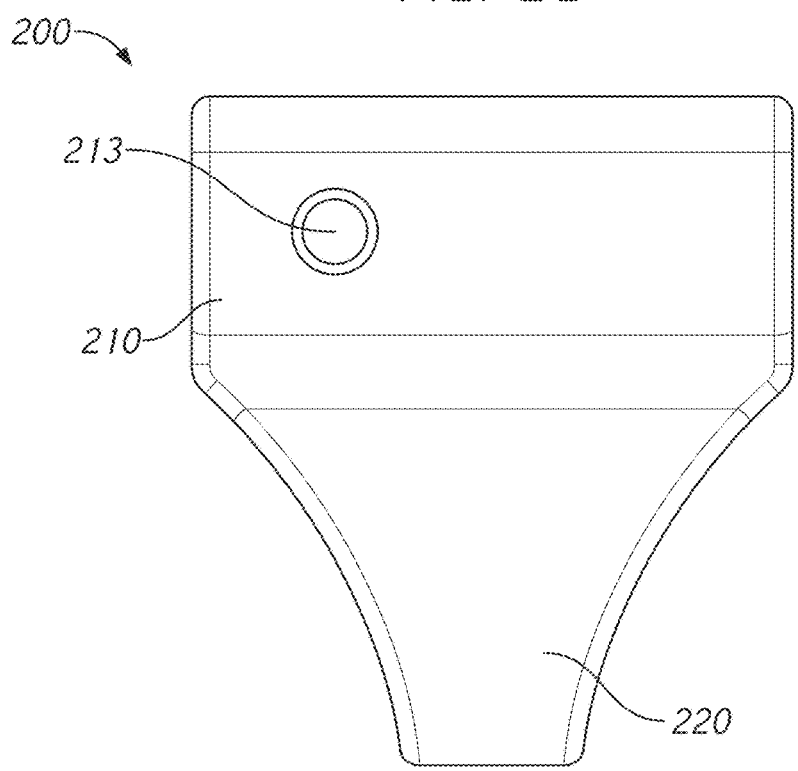
Figure 2I:
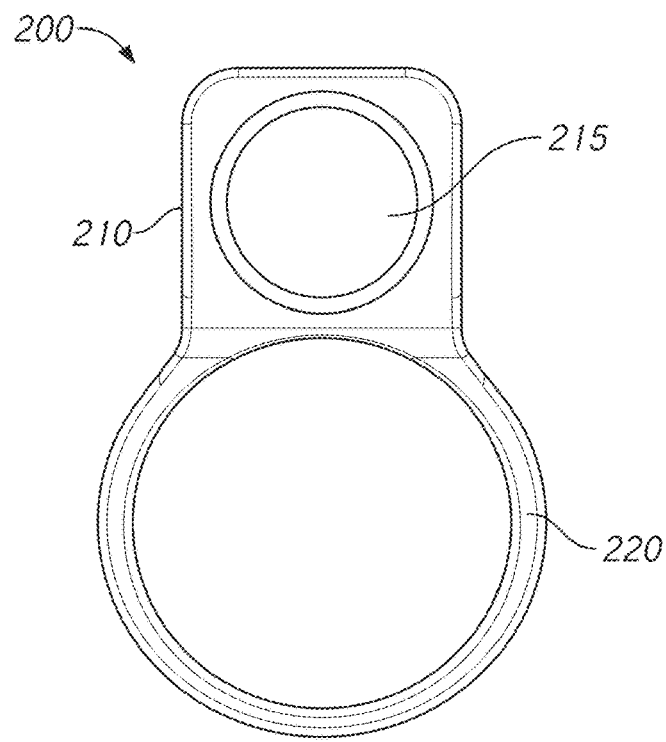
Figure 2J:
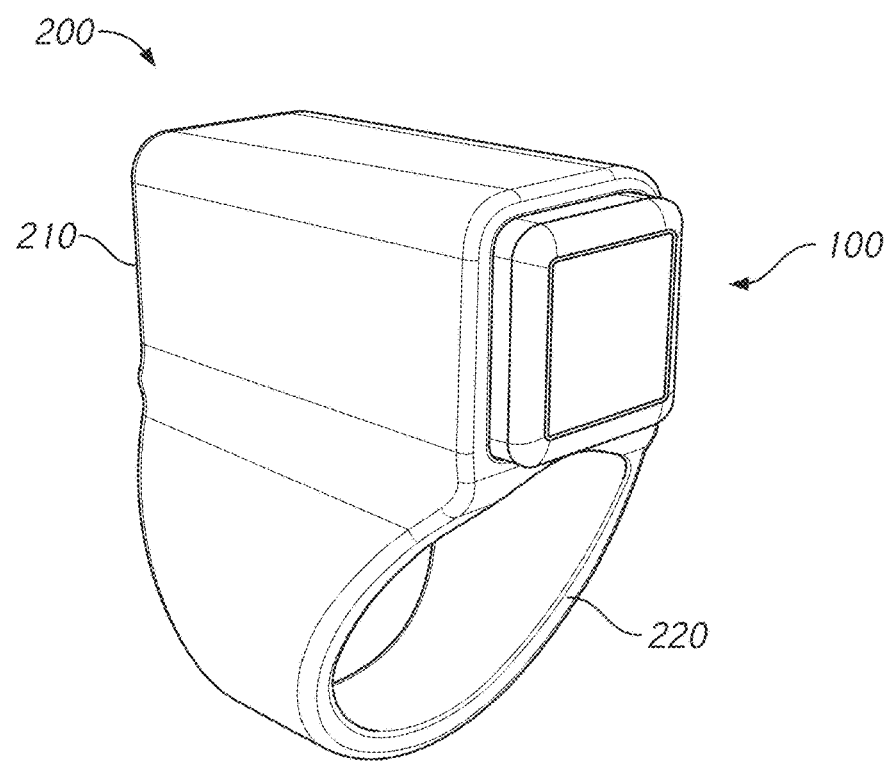
Figure 2K:
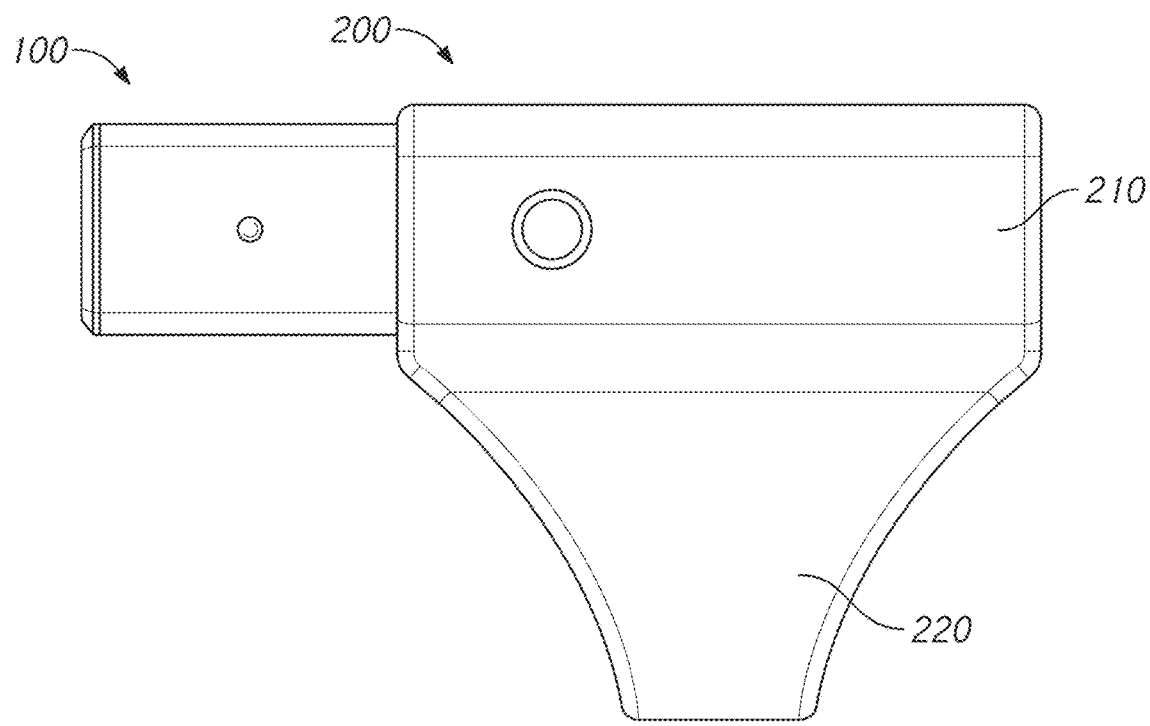
Figure 2L:
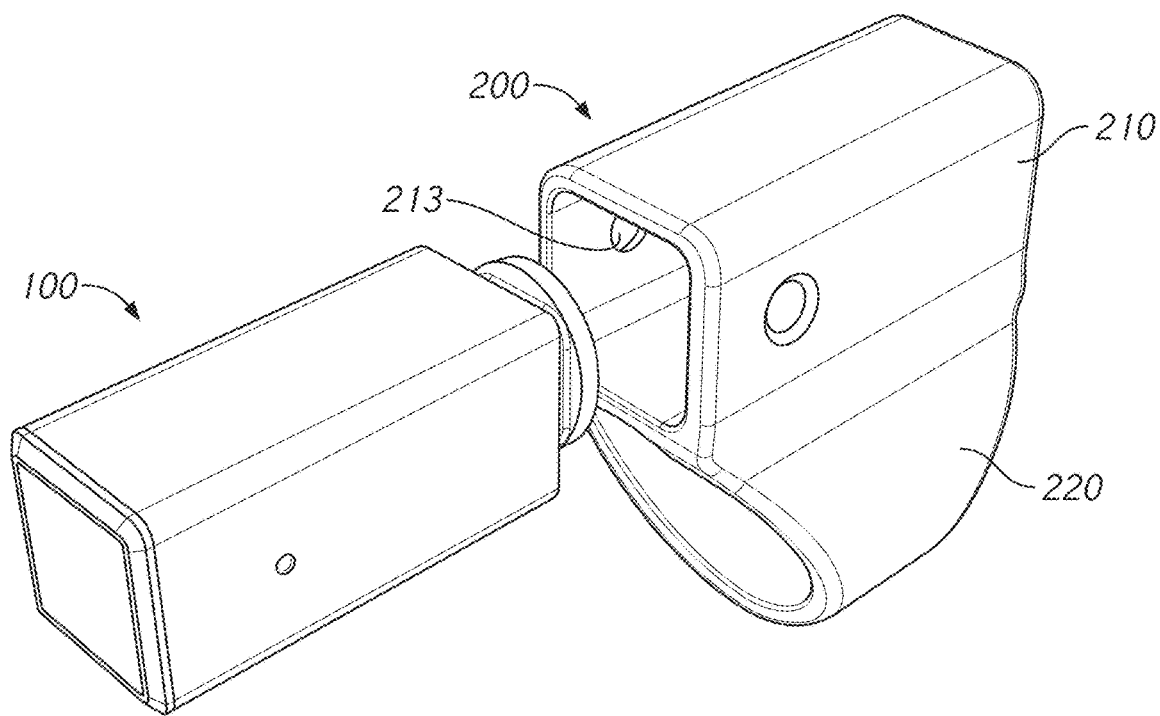

FIGS. 2G and 2H are side images of example embodiments of the ring mount 200. FIG. 2I is a rear image of an example embodiment of the ring mount 200, showing the rear opening 215 in the camera enclosure 210. FIG. 2J is a front perspective image of an example embodiment of the ring mount 200 with the camera 100 shown in the inserted position within the camera enclosure 210. FIG. 2K is a side image of an example embodiment of the ring mount 200 that shows the camera 100 as it is being slid into the camera enclosure 210. Finally, FIG. 2L is a front perspective image of an example embodiment of the ring mount 200 which shows the camera 100 aligned with the front opening of the camera enclosure 210 prior to insertion.

Figure 3:
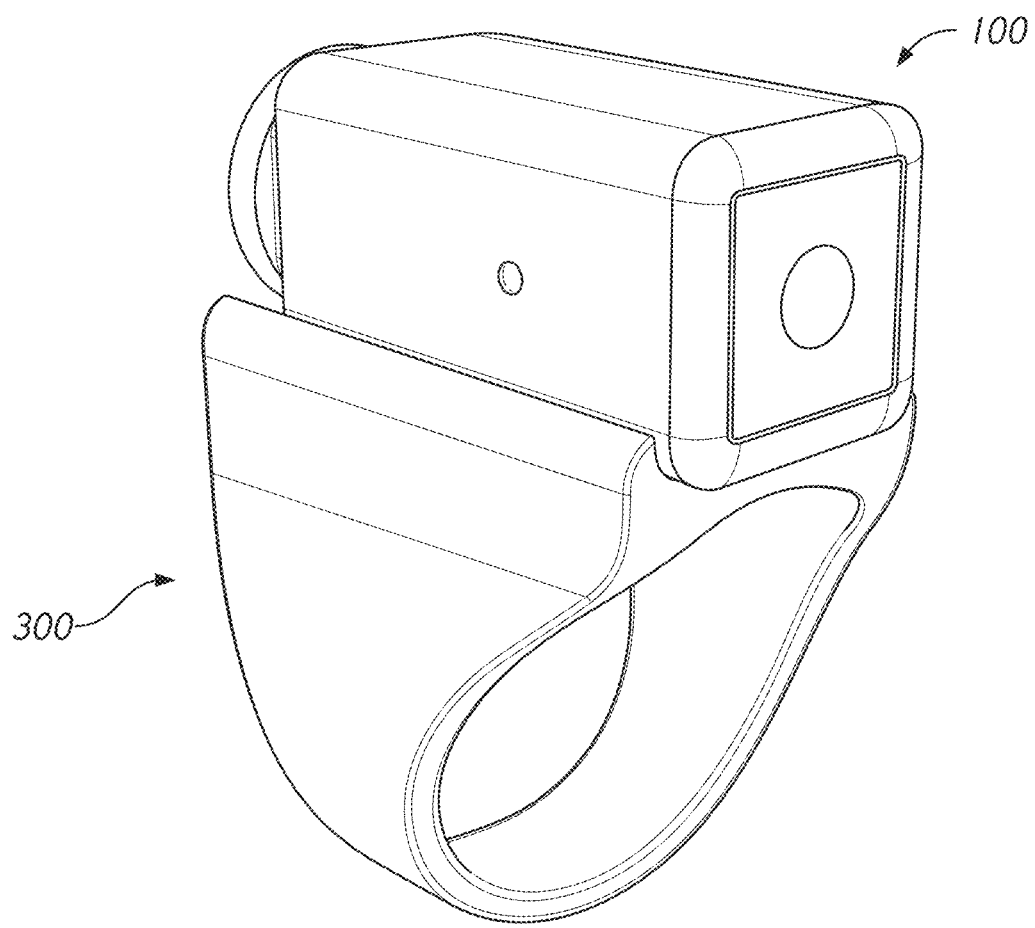

FIG. 3 is a front perspective image of an example embodiment of another ring mount 300. In this embodiment, the ring mount 300 still includes a finger loop, but it no longer includes a camera enclosure. Instead, the camera 100 is mounted to a platform provided above the finger loop. In some embodiments, the camera 100 can be magnetically attached to the platform. The mounting surface and magnets can be as described in U.S. patent application Ser. No. 15/939,633, which is incorporated by reference herein in its entirety. The ring mount 300 can include side flanges which project vertically from the mounting surface adjacent to the sidewalls of the camera 100. The side flanges run the length of the mounting platform along the longitudinal axis of the camera 100 and help to hold the camera in place.

Figure 4:
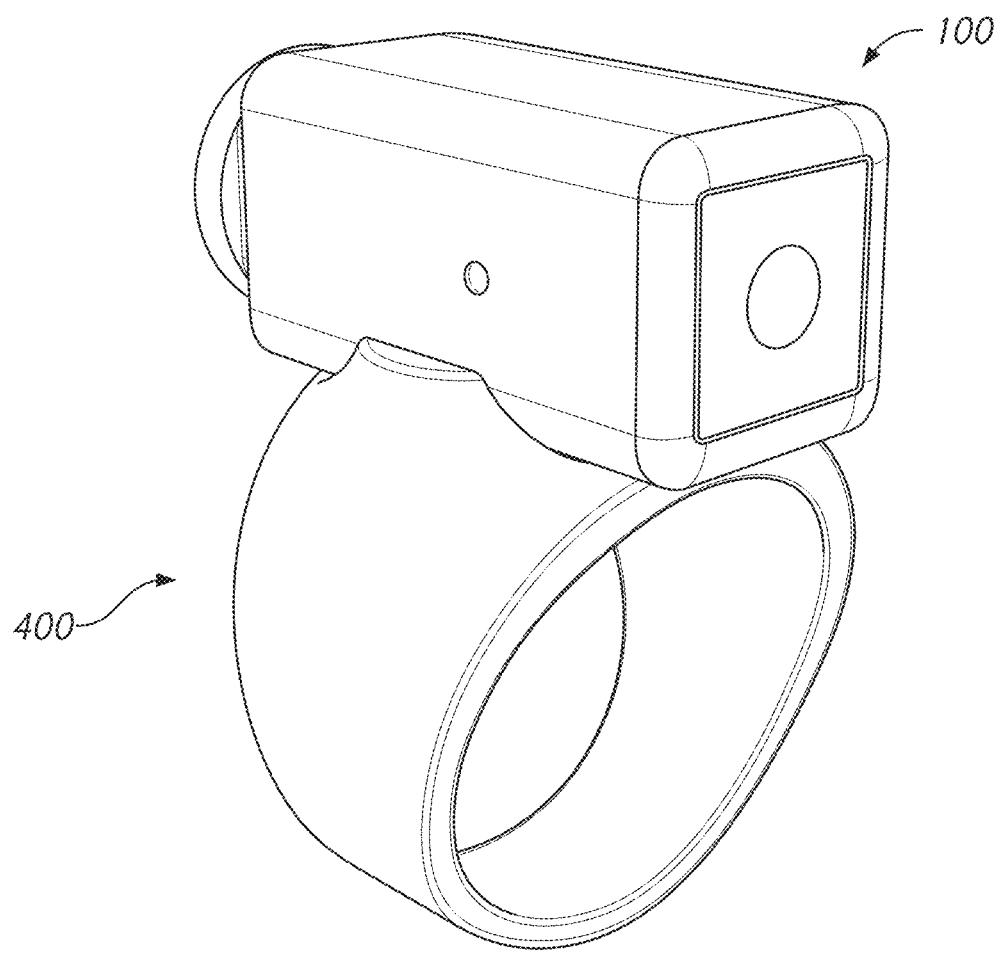

FIG. 4 is a front perspective image of an example embodiment of yet another ring mount 400. Like the ring mount 300 shown in FIG. 3, the ring mount 400 includes a finger loop but no camera enclosure. Instead the camera 100 is once again mounted to a platform provided above the finger loop. Once again, the camera 100 can be magnetically attached to the platform. The ring mount 400 is differentiated from the ring mount 300 shown in FIG. 3 in that the side flanges do not extend the entire length of the mounting platform.

In some embodiments, the camera 100 can be attached to a ring mount using other types of releasable connectors, such as a snap connector, a screw connector, etc.

Figure 5A:
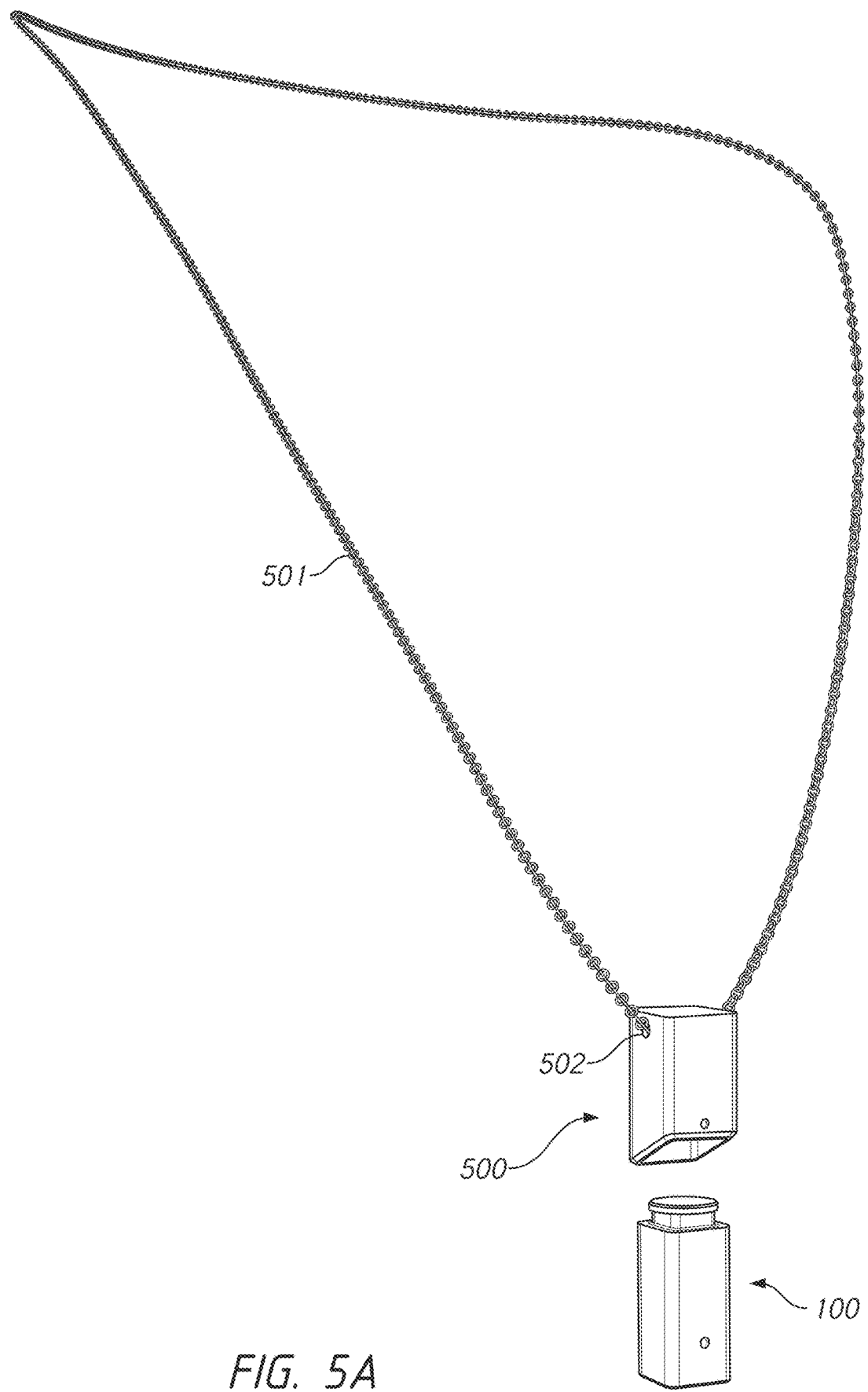

FIG. 5A illustrates an example embodiment of a necklace mount 500 for the camera 100. The necklace mount 500 serves as an enclosure that is sized and shaped to slidably receive the camera 100 through the front opening of the necklace mount 500. In the illustrated embodiment, the front opening of the necklace mount is angled due to the fact that the front surface of the mount is shorter than the rear surface. This allows the camera's control button(s), which is/are located in the front half of the top surface of the camera 100, to still be accessible when the camera is inserted into the necklace mount. Near its rear surface, the necklace mount 500 can include a hole 502 that passes through the side surfaces of the enclosure. A necklace 501, such as a chain, can be passed through the hole 502, thereby allowing the necklace mount 500 to be worn around the user's neck. In other embodiments, the necklace 501 can be attached in some other way, such as via a ring, loop, etc. attached to, or otherwise integrated with, the necklace mount 500.

Figure 5B:
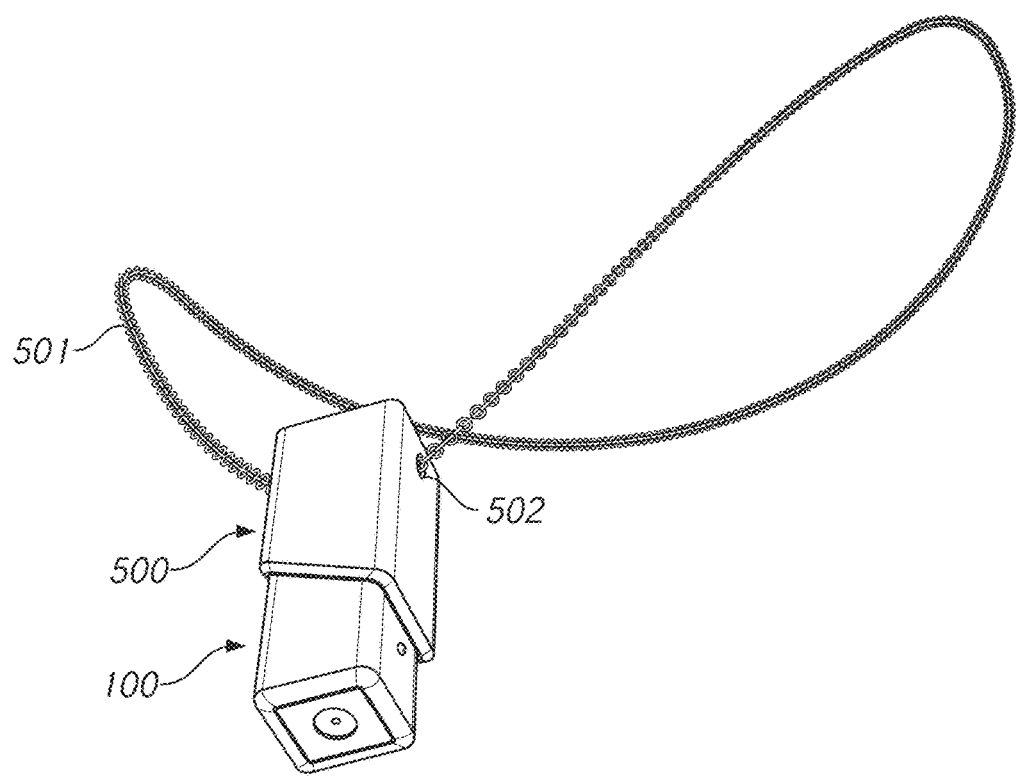
Figure 5C:
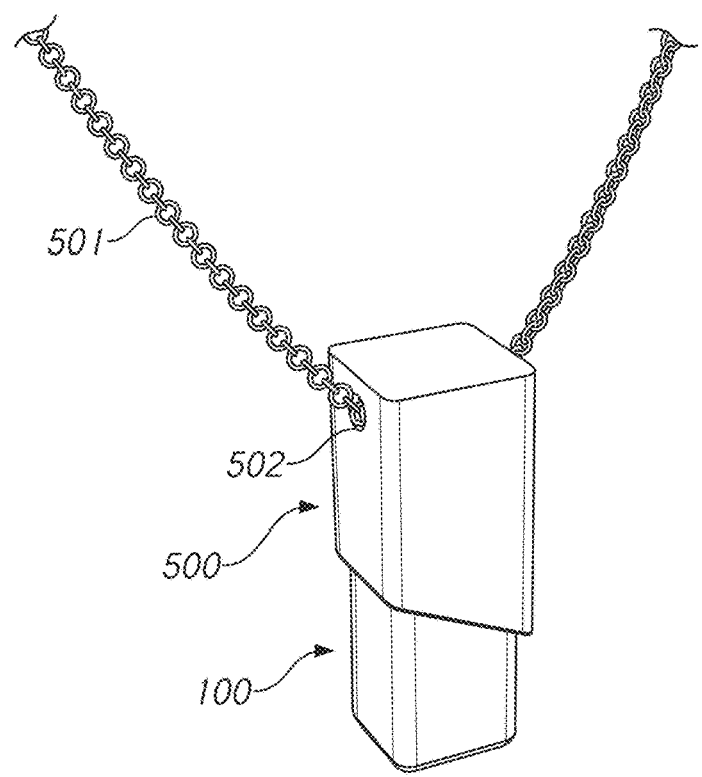
Figure 5D:
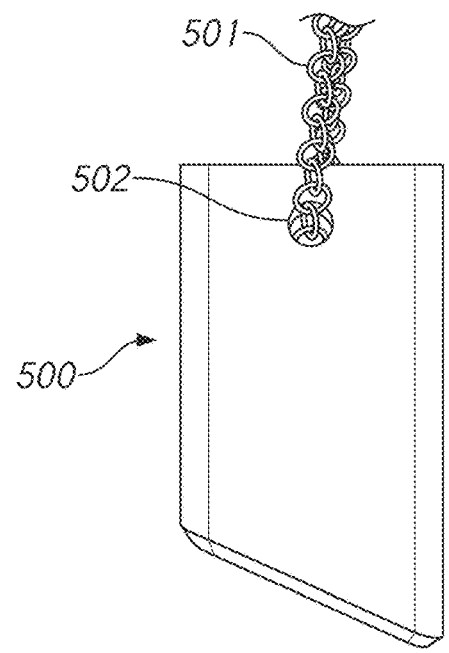
Figure 5E:
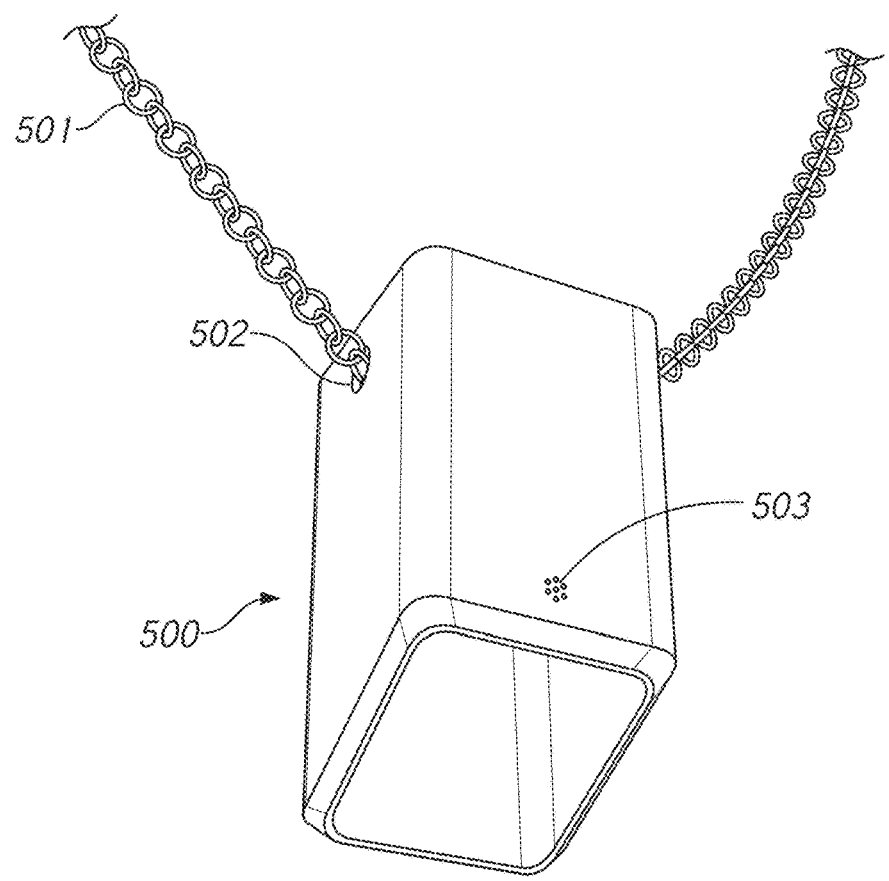

FIG. 5B is a front perspective image of an example embodiment of the necklace mount 500 that shows the camera 100 inserted into the enclosure. FIG. 5C is a side perspective image of an example embodiment of the necklace mount 500 that likewise shows the camera 100 inserted into the enclosure. FIG. 5D is a side image of an example embodiment of the necklace mount 500. FIG. 5E is a side perspective image of an example embodiment of the necklace mount 500. In this embodiment, one or more apertures 503 are provided in one of the sidewalls of the necklace mount 500. These apertures 503 can be positioned so as to align with the camera's microphone when the camera is inserted into the necklace mount 500.

Figures 5F, 5G:
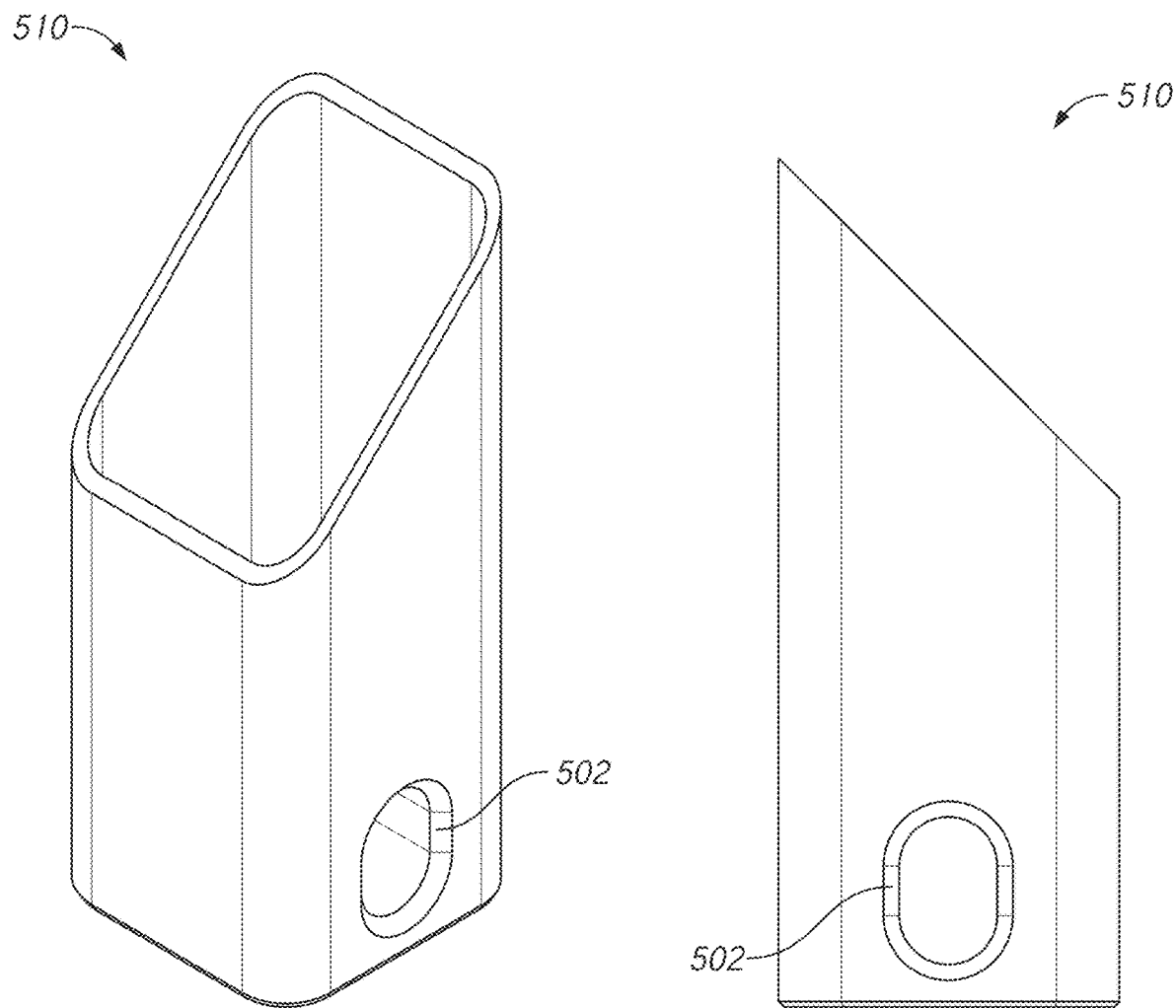
Figure 5H:
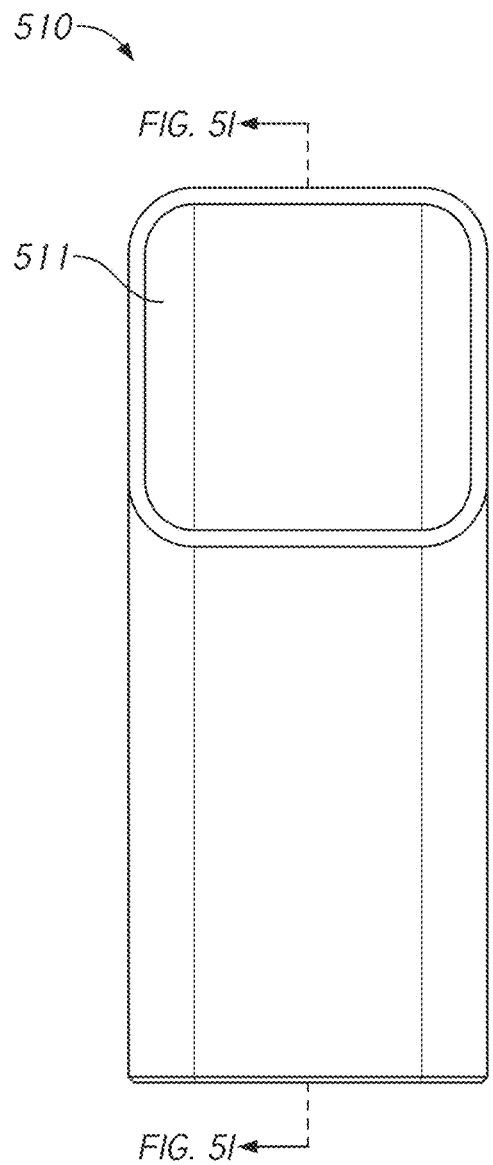

FIG. 5F is a side perspective view of an example embodiment of an outer shell for the necklace mount 500. The outer shell 510 can be made of a hard material, such as plastic or metal. The outer shell 510 includes a front opening 511 into which the camera 100 is inserted. The outer shell 510 also includes the hole 502 for the chain. FIGS. 5G and 5H are side views of the outer shell 510.

Figure 5I:
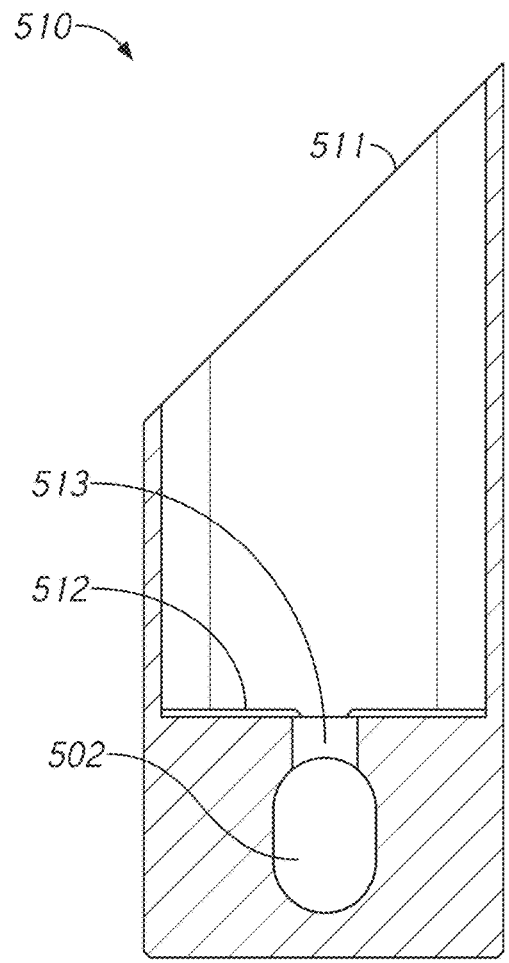

FIG. 5I is a cross-sectional view of the outer shell 510. The cross-sectional view shows that the outer shell 510 can include a rear surface 512 against which the camera 100 abuts when it is fully inserted into the camera mount 500 through the front opening 511. The rear surface 512 can include an aperture 513. The aperture 513 allows air communication between the interior of the outer shell 510 and the chain hole 502. As discussed further below, this aperture 513 helps facilitate insertion, and removal, of the camera 100 into, and from, the necklace mount 500.

Figure 5J:
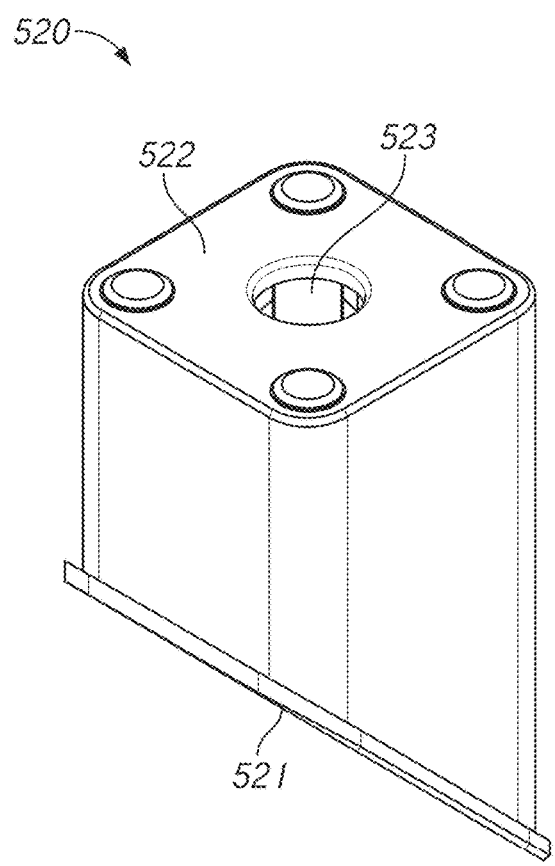
Figure 5K:
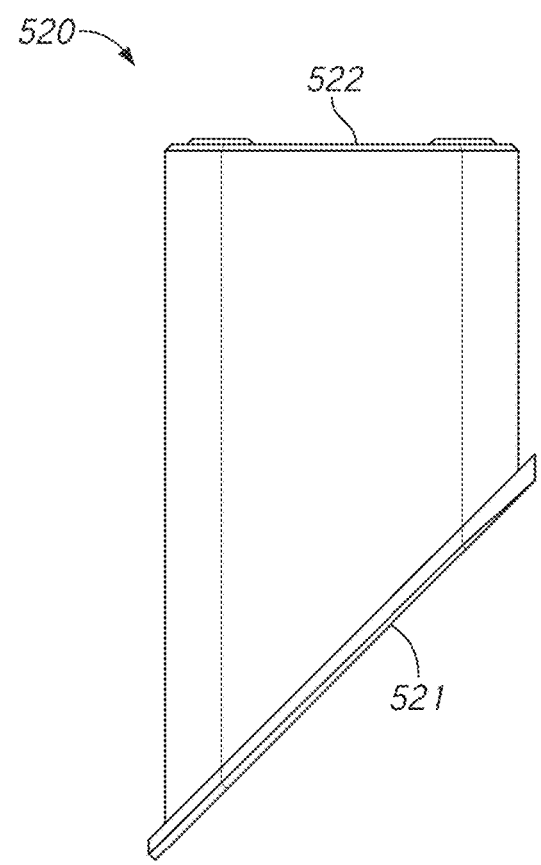

FIG. 5J is a rear perspective view of an example embodiment of an inner shell 520 which is provided inside the outer shell 510. FIG. 5K is a side view of the inner shell 520. The outer dimensions of the inner shell 520 can be sized to allow for snug insertion into the outer shell 510. The inner shell 520 includes a front opening 521 which receives the camera 100. The inner dimensions of the inner shell 520 can be sized to allow for snug insertion of the camera 100. The inner shell 520 can be made of a resilient material, such as rubber or silicone, to help hold the camera 100 in place within the necklace mount 500.

The inner shell 520 can include a rear surface 522. The rear surface 522 of the inner shell 520 can abut against the rear surface 512 of the outer shell 510 when the inner shell is inserted therein. The inner shell 520 can also include an aperture 523. The aperture 523 is positioned so as to be aligned with the aperture 513 in the outer shell 510. Thus, air can still flow between the enclosure of the necklace mount 500 and the chain hole 502 even when the inner shell 520 is inserted into the outer shell 510. In a similar manner as already discussed with respect to the ring mount 200, this airflow can facilitate insertion of the camera 100 into the necklace mount 500 by allowing air to pass out the back of the mount. It can also facilitate removal of the camera 100 from the necklace mount 500 by allowing air to flow in through the back of the mount, thereby preventing a suction effect which would resist removal of the camera 100.

Figure 5L:
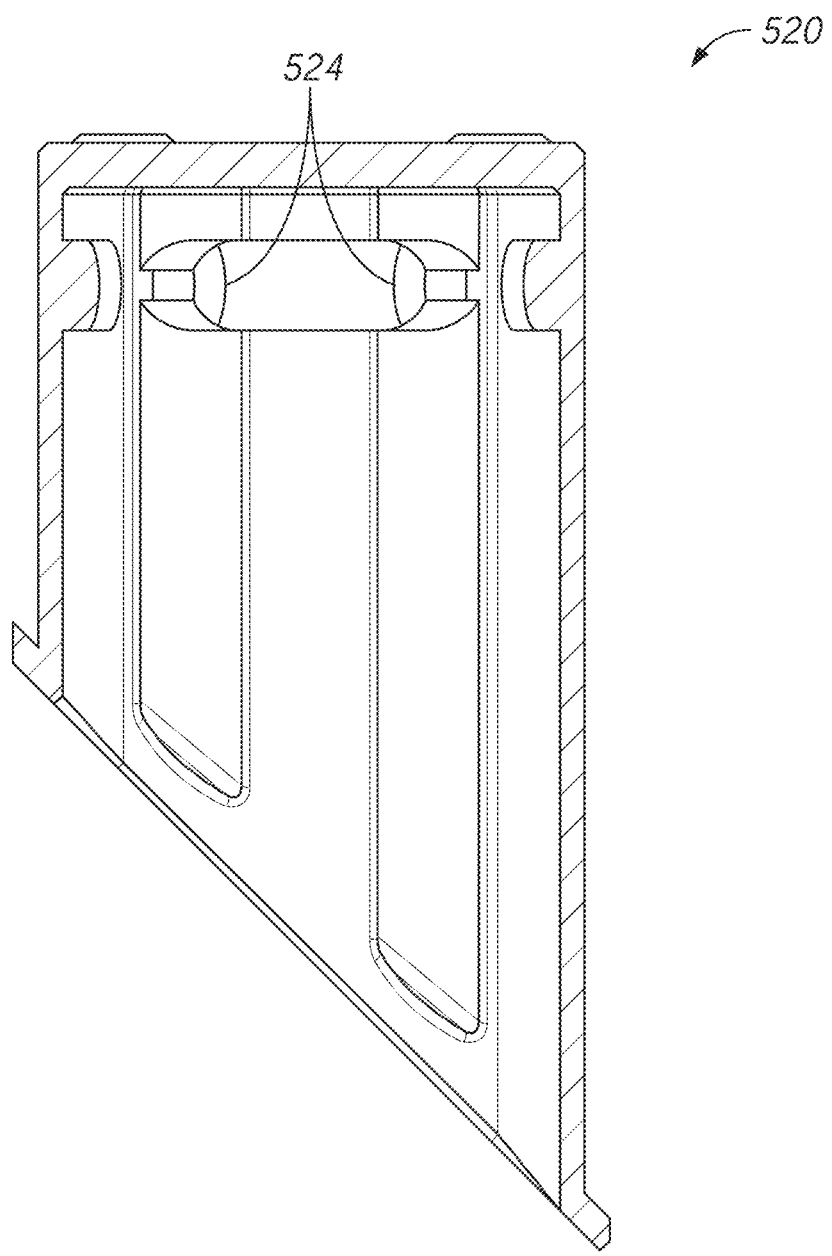

FIG. 5L is a side view of the inner shell 520 with a cutaway which shows mounting projections 524. The mounting projections 524 can be made of a resilient material and can be provided near the rear surface 522 of the inner shell 520. When the camera 100 is inserted into the inner shell 520, the mounting projections 524 securely hold the camera 100 by its mounting flange 140. The distance between the mounting projections 524 and the rear surface 522 of the inner shell 520 can correspond to the thickness of the mounting flange 140, so as to securely hold the camera 100 in place within the necklace mount 500.

While different camera enclosures have been shown and described with respect to the ring mount (e.g., 200) and the necklace mount (e.g., 500), it should be understood that the camera enclosures, as well as their features, may be used interchangeably in the various disclosed embodiments. For example, a ring mount may utilize a camera enclosure (or any of its features) disclosed with respect to a necklace mount, and vice versa. In addition, as is the case with a ring mount, the camera 100 can be attached to a necklace mount using other types of releasable connectors, such as a snap connector, a screw connector, etc.

Figure 6:
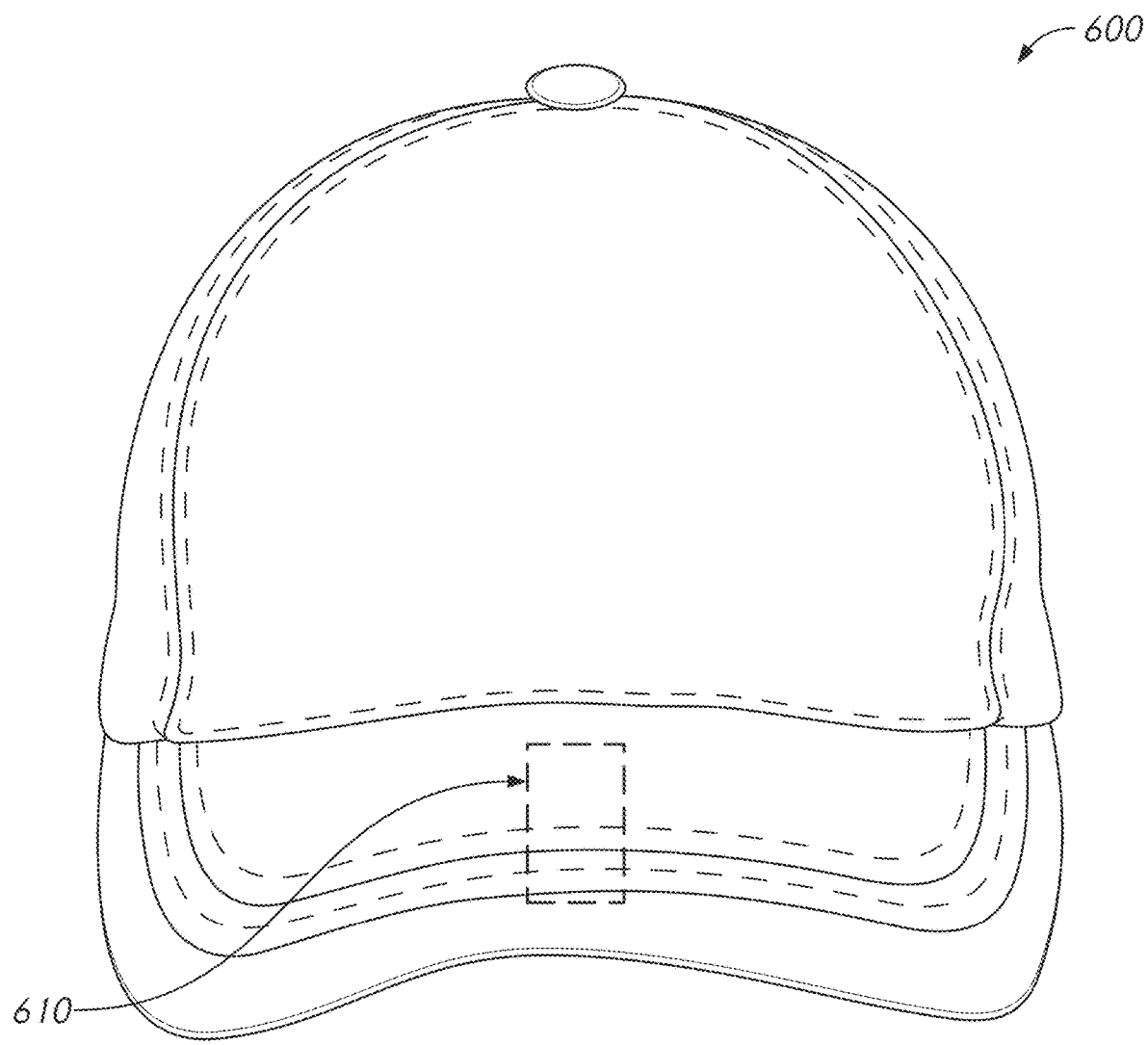

FIG. 6 is a front view of a baseball-style hat 600 with a camera mount 610 integrated inside the bill. In some embodiments, the camera mount 610 is a ferromagnetic plate, and/or one or more magnets, that is/are integrated inside the bill of the hat 600. In some embodiments, the camera mount 610 is not exposed to the exterior of the bill, but is rather provided in a void formed in the bill material and then covered with fabric. Thus, the camera mount 610 does not alter the appearance of the hat 600. As already discussed, the camera 100 can include a magnet 150. Thus, the camera 100 can magnetically attach to the camera mount 610 in the bill of the hat. In some embodiments, the camera mount 610 can be used to attach the camera 100 to the top or bottom of the bill of the hat.

FIG. 7A illustrates an example embodiment of an eyewear mount 700. The eyewear mount 700 can slip over one of the temples of a pair of eyeglasses and can securely hold the camera 100 to the eyeglasses via magnetic attraction.

The eyewear mount 700 can include an outward-facing mounting surface 702 and an inward-facing surface 704. An eyeglass temple channel 710 runs longitudinally through the eyewear mount 700 between the mounting surface 702 and the inward-facing surface 704. The user can slide the temple of his or her eyeglasses through the temple channel 710 (with the mounting surface 702 facing outward) until the eyewear mount 700 is adjacent to the hinge which connects the temple to the frame of the eyeglasses.

One or more magnets 720a, 720b can be provided inside the eyewear mount 700 between the mounting surface 702 and the eyeglass temple channel 710. For example, the magnets 720a, 720b can be located in pockets 722a, 722b— voids inside the eyewear mount 700—adjacent to the mounting surface 702. Thus, the magnets 720a, 720b can hold the camera 100 against the mounting surface 702 via magnetic attraction between the magnets 720a, 720b inside the eyewear mount 700 and one or more magnets integrated into the camera itself. The mounting surface 702 and magnets can be as described in U.S. patent application Ser. No. 15/939,633, which is incorporated by reference herein in its entirety.

The eyewear mount 700 can be made of a resilient material, such as rubber or silicone, for the comfort of the user. The use of a resilient material additionally makes it possible for the eyeglass temple channel 710 and the openings to the magnet pockets 722a, 722b to be slightly smaller than the dimension(s) of the eyeglass temple and the magnets 720a, 720b, respectively. This allows the openings to be stretched while the eyeglass temple is inserted into the eyeglass temple channel 710, or the magnets are inserted into their pockets. The resiliency of the material can then hold the eyewear mount 700 securely in place, and the magnets securely inside the pockets.

FIG. 7B is a side view of the eyewear mount 700. This view more closely illustrates the eyeglass temple channel 710 which runs longitudinally through the eyewear mount 700 between the outward-facing mounting surface 702 and the inward-facing surface 704.

FIG. 7C is a perspective view of the eyewear mount 700. As illustrated, the outward-facing mounting surface 702 can be a flat surface against which the camera 100 is magnetically secured in place.

Figure 7D:
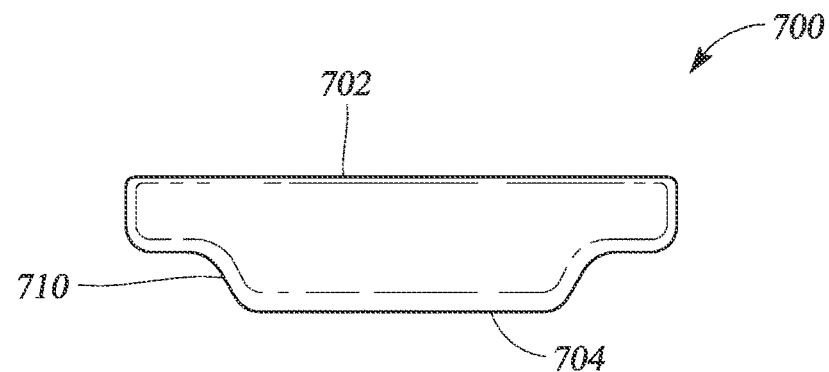

FIG. 7D is a top view of the eyewear mount 700. This view, once again, illustrates the outward-facing mounting surface, the inward-facing surface 704, and the eyeglass temple channel 710.

Figure 7E:
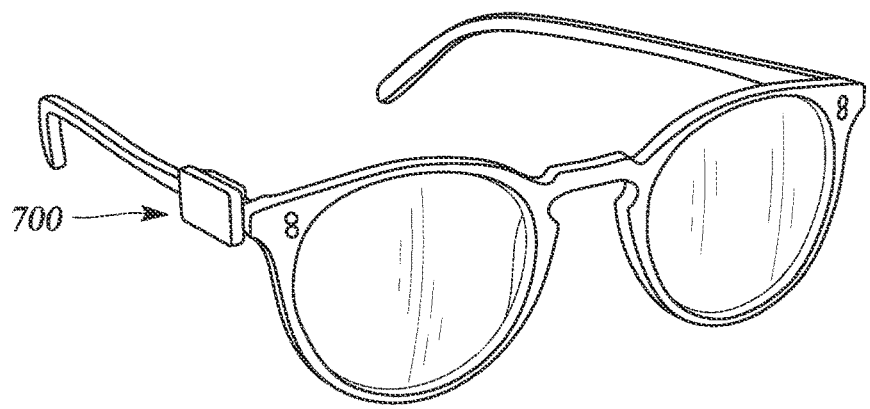

FIG. 7E is a perspective view of the eyewear mount 700 attached to a pair of eyeglasses. As illustrated, the temple of the eyeglasses has been inserted through the eyeglass temple channel 710 of the eyewear mount 700. The eyewear mount 700 has been slid up the temple of the eyeglasses until it is adjacent to the hinge which connects the temple to the frame of the eyeglasses.

Figure 7F:
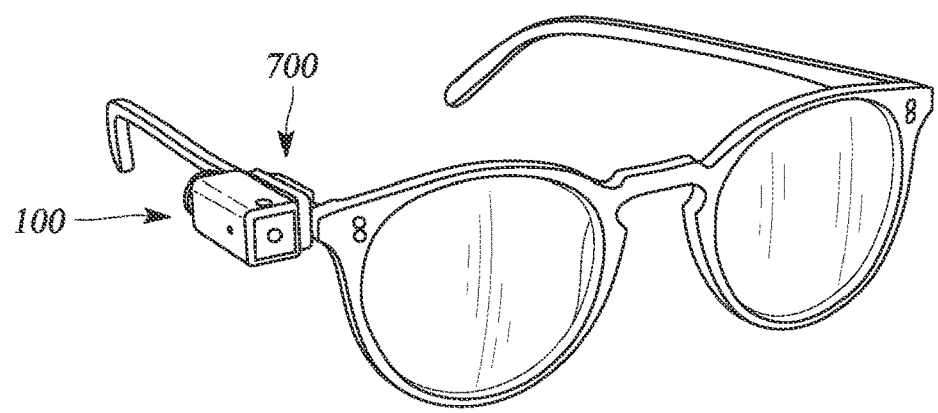

FIG. 7F is a perspective view of the portable camera 100 magnetically attached to the mounting surface 702 of the eyewear mount 700, which is in turn attached to a pair of eyeglasses. The eyewear mount 700 can be used with any eyewear that has a temple. Thus, a user can attach the portable camera 100 to his or her own glasses using the eyewear mount 700.

In some embodiments, the camera 100 can be attached to an eyewear mount using other types of releasable connectors, such as a snap connector, a screw connector, etc.

Figure 8A:
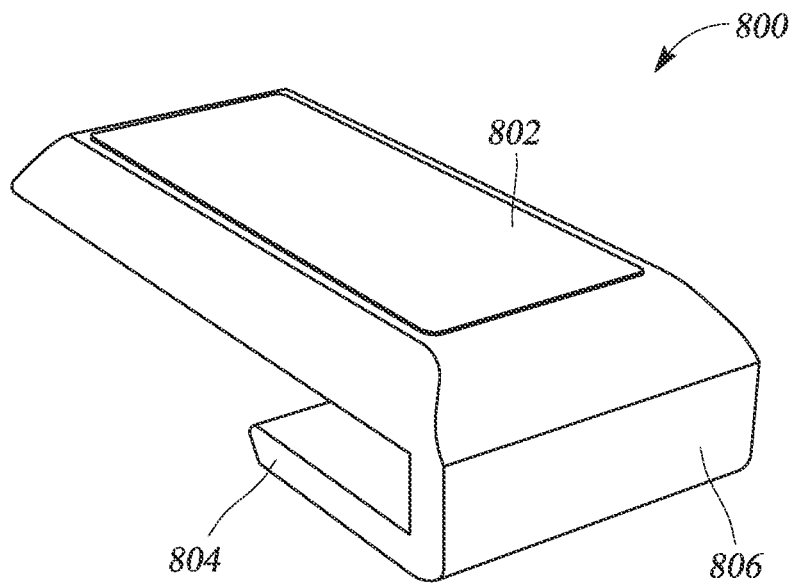

FIG. 8A illustrates an example embodiment of a removable hat mount 800. The removable hat mount 800 includes a mounting surface 802 and a clip portion 804. One or more internal magnets are provided in the removable hat mount 800 underneath the mounting surface 802 to magnetically secure the portable camera 100 to the mounting surface. The clip portion 804 is designed to attach to the bill of a baseball-style hat (e.g., hat 600 in FIG. 6). In the illustrated embodiment, the clip portion 804 is a plate that extends backwards from a bridge 806 which is located at the front of the removable hat mount 800. The bridge 806 connects the mounting surface 802 with the clip portion 804. The clip portion 804 is generally parallel to, but spaced-apart from, the mounting surface 802, with the distance between the clip portion and the mounting surface being determined by the length of the bridge 806. When the removable hat mount 800 is attached to the bill of a hat, the upper portion of the mount sits on top of the front of the bill whereas the clip portion 804 extends underneath the bill. The length of the clip portion 804 may be, for example, at least a third of the length of the mounting surface 802.

Figure 8B:
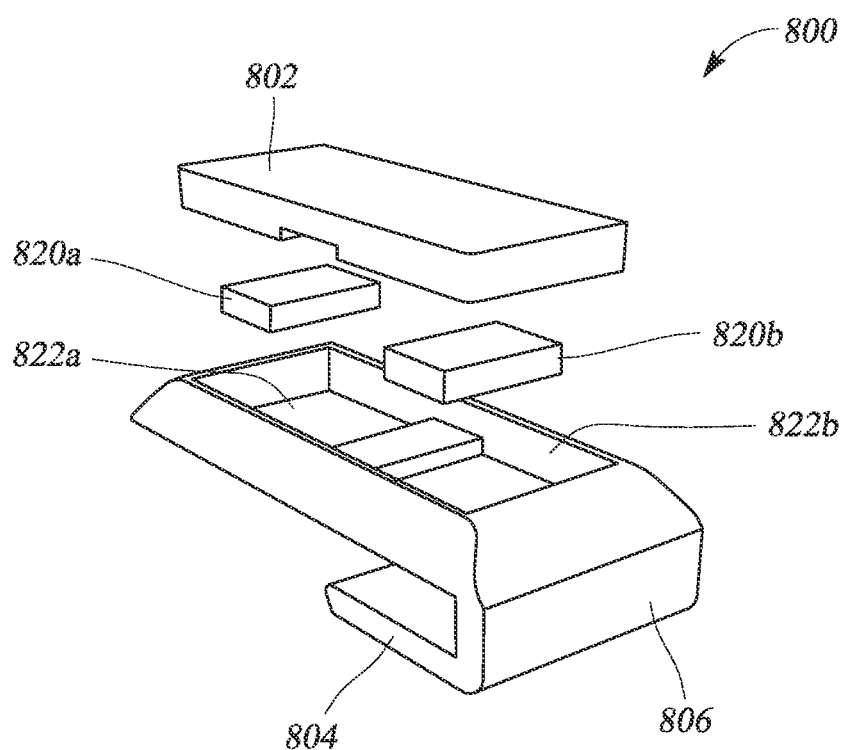

FIG. 8B is an exploded view of the removable hat mount 800. The exploded view shows the mounting surface 802 and the clip portion 804 (connected by the bridge 806). The exploded view further illustrates that the upper portion of the removable hat mount 800 can include one or more pockets 822a, 822b to hold one or more magnets 820a, 20b. The mounting surface 802 can be inserted flush into the upper portion of the removable hat mount 800 so as to secure the magnets 820a, 820b in place.

Figure 8C:
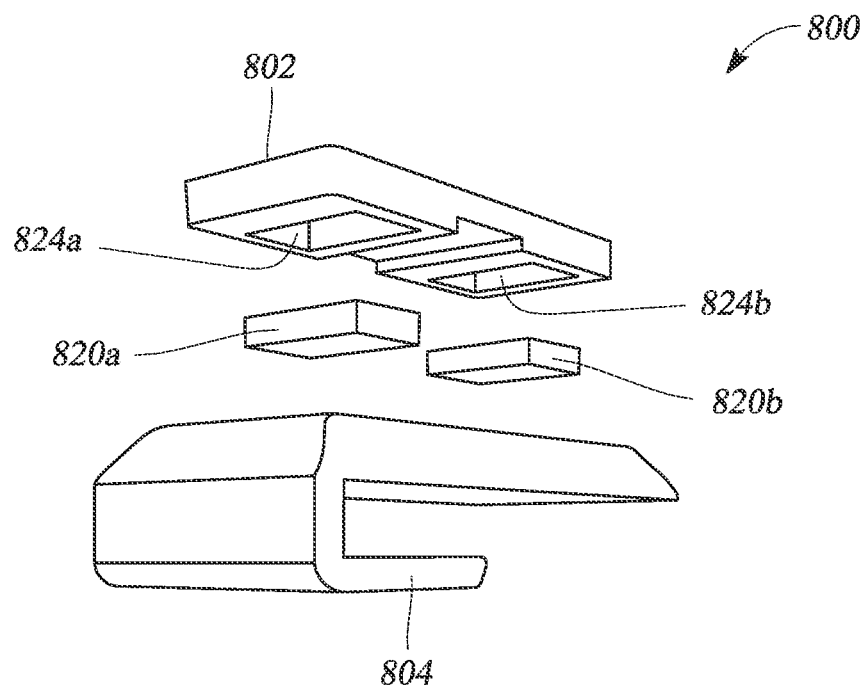

FIG. 8C is another exploded view of the removable hat mount 800. This exploded view shows that the mounting surface 802 can also include one or more pockets 824a, 824b to help secure the magnets 820a, 820b in place when the mounting surface is inserted into the upper portion of the removable hat mount 800.

Figure 8D:
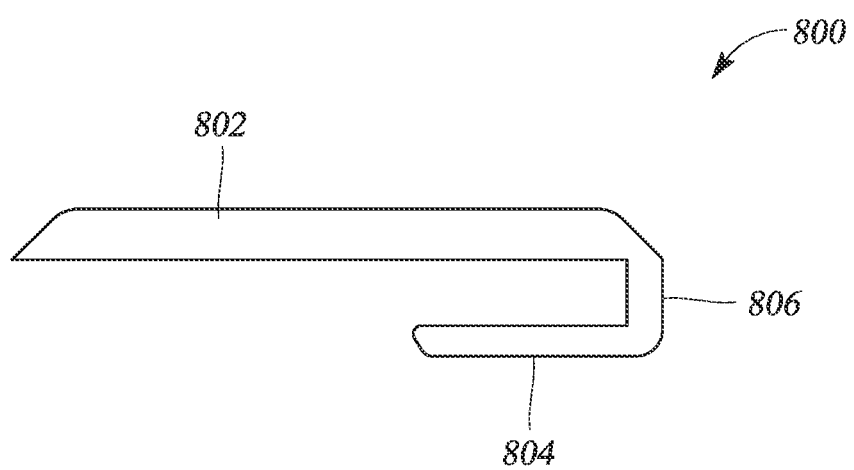

FIG. 8D is a side view of the removable hat mount 800. The side view clearly illustrates the mounting surface 802 and the clip portion 804. When the removable hat mount 800 is positioned on a hat, the front portion of the brim of the hat is located in the space between the mounting surface 802 and the clip portion 804 that is created by the bridge 806. The length of the bridge 806 can be sized to provide a gap between the mounting surface 802 and the clip portion 804 that is somewhat smaller than the width of the brim of the hat. In this way, when the removable hat mount 800 is attached to the brim of the hat, the clip portion 804 can flex slightly away from the mounting surface 802 and can hold the removable hat mount 800 in place via a restoring force provided by the bridge 806.

In some embodiments, the camera 100 can be attached to a hat mount using other types of releasable connectors, such as a snap connector, a screw connector, etc.

Other Considerations

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An eyewear mount for a portable camera, the eyewear mount comprising:
    an outward-facing mounting surface;
    an inward-facing surface; and
    an eyeglass temple channel between the outward-facing mounting surface and the inward-facing surface,
    wherein the eyewear mount is made of a resilient material.

2. An eyewear mount for a portable camera, the eyewear mount comprising:
    an outward-facing mounting surface;
    an inward-facing surface;
    an eyeglass temple channel between the outward-facing mounting surface and the inward-facing surface;
    one or more magnets between the outward-facing mounting surface and the temple channel,
    wherein the one or more magnets are located in one or more pockets formed in the eyewear mount.

3. The eyewear mount of claim 2, wherein the one or more magnets have a width dimension which is larger than openings to the one or more pockets.

4. A hat mount for a portable camera, the hat mount comprising:
    a camera mounting surface;
    a clip portion;
    a bridge that connects the camera mounting surface and the clip portion together with a gap therebetween; and
    one or more magnets provided underneath the camera mounting surface,
    wherein the one or more magnets are provided in one or more pockets underneath the camera mounting surface.

\* \* \* \* \*